(12) United States Patent
Shimoshikiryoh et al.

(10) Patent No.: US 11,971,632 B2
(45) Date of Patent: Apr. 30, 2024

(54) DIMMING PANEL, PRODUCTION METHOD FOR DIMMING PANEL AND LIQUID CRYSTAL DISPLAY DEVICE

(71) Applicant: SHARP KABUSHIKI KAISHA, Sakai (JP)

(72) Inventors: Fumikazu Shimoshikiryoh, Sakai (JP); Shigeyuki Yamada, Sakai (JP); Toshinori Sugihara, Sakai (JP); Takehisa Yoshida, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 25 days.

(21) Appl. No.: 17/878,278

(22) Filed: Aug. 1, 2022

(65) Prior Publication Data

US 2023/0038730 A1      Feb. 9, 2023

Related U.S. Application Data

(60) Provisional application No. 63/229,005, filed on Aug. 3, 2021.

(51) Int. Cl.
| | | |
|---|---|---|
| G02F 1/1343 | (2006.01) | |
| G02F 1/133 | (2006.01) | |
| G02F 1/1335 | (2006.01) | |
| G02F 1/1337 | (2006.01) | |
| G02F 1/1347 | (2006.01) | |

(52) U.S. Cl.
CPC .... *G02F 1/134309* (2013.01); *G02F 1/13306* (2013.01); *G02F 1/13439* (2013.01); *G02F 1/133601* (2021.01); *G02F 1/133707* (2013.01); *G02F 1/134372* (2021.01); *G02F 1/1347* (2013.01); *G02F 2203/48* (2013.01)

(58) Field of Classification Search
CPC ......... G02F 1/133707; G02F 1/134363; G02F 1/134372; G02F 1/133601; G02F 2203/48
See application file for complete search history.

(56) References Cited

U.S. PATENT DOCUMENTS

| | | | |
|---|---|---|---|
| 2009/0109358 A1* | 4/2009 | Tanaka | G02F 1/134363 349/38 |
| 2018/0107036 A1* | 4/2018 | Shao | G02F 1/1343 |

FOREIGN PATENT DOCUMENTS

| | | |
|---|---|---|
| JP | 2017-111220 A | 6/2017 |
| WO | 2008/053724 A1 | 5/2008 |

\* cited by examiner

*Primary Examiner* — Jessica M Merlin
(74) *Attorney, Agent, or Firm* — ScienBiziP, P.C.

(57) ABSTRACT

The present invention provides a dimming panel sequentially including: a first substrate; a liquid crystal layer; and a second substrate, the first substrate sequentially including an insulating substrate, a first electrode, a first insulator layer, and a second electrode, the second electrode including, in a plan view, linear electrodes parallel to each other with slit regions in between, and bridge electrodes each of which is disposed in one of the slit regions and is connecting two adjacent linear electrodes, the bridge electrodes including a first bridge electrode in a first slit region, a second bridge electrode in a second slit region adjacent to the first slit region, and a third bridge electrode in a third slit region adjacent to the second slit region, the first bridge electrode, the second bridge electrode, and the third bridge electrode being discrete from one another.

8 Claims, 22 Drawing Sheets

DIMMING PANEL, PRODUCTION METHOD FOR DIMMING PANEL AND LIQUID CRYSTAL DISPLAY DEVICE

CROSS-REFERENCE TO RELATED APPLICATIONS

The present application claims priority under 35 U.S.C. § 119 to U.S. Provisional Patent Application No. 63/229,005 filed on Aug. 3, 2021, the contents of which are incorporated herein by reference in their entirety.

BACKGROUND OF THE INVENTION

Field of the Invention

The present invention relates to dimming panels, production methods for a dimming panel, and liquid crystal display devices.

Description of Related Art

Dimming panels are panels that can control the transmittance of light in response to the voltage applied to the panel. For example, a dimming panel can be used as an optical component that is placed between an image-providing liquid crystal panel and a backlight and controls the amount of light from the backlight (hereinafter, also referred to as backlight illumination) transmitted therethrough, or as a component that controls the amount of external light transmitted therethrough into a building, a vehicle, or the like. One of dimming methods using such a dimming panel includes preparing a liquid crystal composition sealed between a pair of substrates and applying voltage to the liquid crystal composition and thereby changing the alignment of liquid crystal molecules and controlling the amount of light transmitted through the dimming panel.

Liquid crystal display devices are display devices utilizing a liquid crystal composition to display images. In a typical display mode thereof, a liquid crystal panel containing a liquid crystal composition between a pair of substrates is irradiated with light from a backlight and voltage is applied to the liquid crystal composition to change the alignment of liquid crystal molecules, whereby the amount of light transmitted through the liquid crystal panel is controlled. Such liquid crystal display devices have advantageous features such as thin profile, light weight, and low power consumption, and are therefore used in electronic devices such as televisions, smartphones, tablet PCs, and automotive navigation systems.

A study on liquid crystal display devices has been made for disposing a dimming panel between an image-providing liquid crystal panel and the backlight. For example, WO 2008/053724 discloses a liquid crystal display device including: an image-providing panel that includes a liquid crystal display panel; a light source for illuminating the liquid crystal display panel; and a dimming panel disposed between the image-providing panel and the light source, the dimming and including a transmissive liquid crystal display panel and providing grayscale display based on luminance information in a video image signal input to the image-providing panel, wherein the dimming panel includes pixels having a size greater than pixels of the image-providing panel. The "pixels of the dimming panel" in WO 2008/053724 correspond to "dimming units" herein. The "dimming units" will be described later.

BRIEF SUMMARY OF THE INVENTION

Large high-performance displays for devices such as master monitors have been developed. Such a high-performance display, when including a dimming panel, requires excellent viewing angle characteristics not only in its image-providing liquid crystal and but also in the dimming panel. Examples of a dimming panel with excellent viewing angle characteristics include horizontal alignment mode dimming panels. A horizontal alignment mode dimming panel has a structure including, for example, a first substrate including a first electrode and a second electrode with an insulator layer in between; a second substrate opposite to the first substrate; and a liquid crystal layer sealed between the first substrate and the second substrate. The horizontal alignment mode dimming panel utilizes electric fields generated between the first electrode and the second electrode to change the alignment azimuth of the liquid crystal molecules in the liquid crystal layer, thus controlling the amount of light passing through the dimming panel.

When the second electrode includes multiple linear electrodes, electric fields can be generated between the first electrode and the linear electrodes through the portions (i.e., slit regions) formed between the linear electrodes. For application of the same voltage to the linear electrodes, bridge electrodes, which connect the linear electrodes to one another, are used in some cases. The direction of the electric field generated between a bridge electrode and the first electrode is different from the direction of the electric field generated between the linear electrodes and the first electrode. This causes the portions with the bridge electrodes to be misalignment regions in which the liquid crystal molecules are not aligned at the desired azimuth. Such misalignment regions (dark lines) can be made unobservable from the viewer in an image-providing liquid crystal panel even when the liquid crystal panel has an electrode structure in which linear electrodes are connected by bridge electrodes. This is because an image-providing liquid crystal panel includes shielding components such as a black matrix in its color filter substrate and can employ an arrangement in which the bridge electrodes are covered by the shielding components such that the misalignment regions are hidden. In contrast, the misalignment regions are observed as dark lines in a dimming panel, which includes no shielding components such as a black matrix, when the bridge electrodes are periodically arranged in a straight line. The dimming panel therefore has a deteriorated display quality in some cases. In addition, overlaying the dimming panel with the image-providing liquid crystal panel sometimes causes the periodically arranged bridge electrodes to interfere with the components such as conductive lines of the image-providing liquid crystal panel, leading to occurrence of moiré.

The present inventors made studies on the arrangement of bridge electrodes in order to improve the display quality of the dimming panel and reduce or prevent occurrence of moiré. As a result, the inventors found that randomly dispersed arrangement, not periodical arrangement, of bridge electrodes disperses the liquid crystal molecule misalignment regions, thus making the misalignment regions less likely to be observed as dark lines and reducing or preventing occurrence of moiré.

WO 2008/053724 discloses an example in which a vertical alignment liquid crystal panel is used as a dimming panel. The dimming panel includes a liquid crystal layer between two substrates, one of which includes transparent electrodes serving as pixel electrodes and the other of which includes a transparent electrode serving as a counter electrode on its entire surface. However, WO 2008/053724 does not mention a horizontal alignment mode liquid crystal panel using electrodes including linear electrodes, and discusses nothing about misalignment of liquid crystal molecules due to use of the bridge electrodes, which is an issue unique to horizontal alignment mode liquid crystal panels.

In response to the above issues, an object of the present invention is to provide a dimming and that has a high display quality and is less likely to cause moiré even when overlaid with an image-providing liquid crystal panel; a production method for the dimming panel; and a liquid crystal display device including the dimming panel.

(1) One embodiment of the present invention is directed to a dimming panel sequentially including: a first substrate; a liquid crystal layer; and a second substrate, the first substrate sequentially including an insulating substrate, a first electrode, a first insulator layer, and a second electrode, the second electrode including, in a plan view, linear electrodes parallel to each other with slit regions in between, and bridge electrodes each of which is disposed in one of the slit regions and is connecting two adjacent linear electrodes, the slit regions including a first slit region, a second sit region adjacent to the first slit region, and a third slit region adjacent to the second slit region, the bridge electrodes including a first bridge electrode in the first slit region, a second bridge electrode in the second slit region, and a third bridge electrode in the third slit region, the first bridge electrode, the second bridge electrode, and the third bridge electrode being discrete from one another.

(2) In an embodiment of the present invention, the dimming panel includes the structure (1), and the first bridge electrode and the second bridge electrode are not arranged in a straight line.

(3) In an embodiment of the present invention, the dimming and includes the structure (1) or (2), the dimming panel further includes a drive circuit and dimming units arranged in an in-plane direction, the first electrode includes first dimming electrodes arranged in the respective dimming units, and the drive circuit is configured to control voltages to be applied to the respective first dimming electrodes and apply a constant voltage to the second electrode.

(4) In an embodiment of the present invention, the dimming panel includes the structure (3), the first substrate further includes, between the insulating substrate and the first electrode, sequentially from the insulating substrate, a lower-layer electrode and a second insulator layer, each of the first dimming electrodes includes island electrodes spaced from one another in a plan view and electrically connected to one another, and a least one of the island electrodes is electrically connected to the lower-layer electrode through a contact hole.

(5) In an embodiment of the present invention, the dimming panel includes the structure (4), at least one of the island electrodes of a selected electrode among the first dimming electrodes is between the island electrodes of an adjacent electrode among the first dimming electrodes, and at least one of the island electrodes of the adjacent electrode is between the island electrodes of the selected electrode.

(6) In an embodiment of the present invention, the dimming panel includes the structure (4) or (5), each of the first dimming electrodes further includes a base electrode provided with apertures, the island electrodes surround the base electrode in a plan view, the base electrode is electrically connected to the lower-layer electrode through another contact hole, at least one of the island electrodes of a selected electrode among the first dimming electrodes is inside at least one of the apertures of an adjacent electrode among the first dimming electrodes, and at least one of the island electrodes of the adjacent electrode is inside at least one of the apertures of the selected electrode.

(7) In an embodiment of the present invention, the dimming panel includes the structure (1) or (2), the dimming panel further includes a drive circuit and dimming units arranged in an in-plane direction, the second electrode includes second dimming electrodes arranged in the respective dimming units, and the drive circuit is configured to apply a constant voltage to the first electrode and control voltages to be applied to the respective second dimming electrodes.

(8) Another embodiment of the present invention is directed to a liquid crystal display device sequentially including: an image-providing liquid crystal panel; the dimming panel having any one of the structures (3) to (7); and a backlight.

(9) Yet another embodiment of the present invention is directed to a production method for a dimming panel, the dimming panel sequentially including: a first substrate; a liquid crystal layer; and a second substrate, the first substrate sequentially including an insulating substrate, a first electrode, a first insulator layer, and a second electrode, the second electrode including, in a plan view, linear electrodes parallel to each other with slit regions in between, and bridge electrodes each of which is disposed in one of the slit regions and is connecting two adjacent linear electrodes; the slit regions including a first slit region and a second slit region adjacent to the first slit region, the bridge electrodes including a first bridge electrode in the first slit region and a second bridge electrode in the second slit region, the production method including: setting bridge formation sites 1 to n in each of the slit regions having a certain length X, each of the bridge formation sites having a length obtained by equally dividing the length X by n, where n is an integer; forming the first bridge electrode at a bridge formation site selected from the bridge formation sites 1 to n of the first slit region; and forming the second bridge electrode at a differently numbered bridge formation site of the second slit region from the bridge formation site where the first bridge electrode is formed.

(10) In an embodiment of the present invention, the dimming panel includes the structure (9), and the bridge electrodes are not arranged at consecutively numbered bridge formation sites in each of the slit regions.

The present invention can provide a dimming panel that has a high display quality and is less likely to cause moiré even when overlaid with an image-providing liquid crystal panel owing to dispersed bridge electrodes which are less likely to be observed as dark lines; a production method for the dimming panel; and a liquid crystal display device including the dimming panel.

DETAILED DESCRIPTION OF THE INVENTION

Hereinafter, dimming panels, production methods for a dimming panel, and liquid crystal display devices of embodiments of the present invention are described. The present invention is not limited to the following embodiments. The design may be modified as appropriate within the range satisfying the configuration of the present invention.

Embodiment 1

A dimming panel of Embodiment 1 sequentially includes: a first substrate; a liquid crystal layer; and a second substrate, the first substrate sequentially including an insulating substrate, a first electrode, a first insulator layer, and a second electrode, the second electrode including, in a plan view, linear electrodes parallel to each other with slit regions in between, and bridge electrodes each of which is disposed in one of the slit regions and is connecting two adjacent linear electrodes, the slit regions including a first slit region, a second slit region adjacent to the first slit region, and a third slit region adjacent to the second slit region, the bridge electrodes including a first bridge electrode in the first slit region, a second bridge electrode in the second slit region, and a third bridge electrode in the third slit region, the first bridge electrode, the second bridge electrode, and the third bridge electrode being discrete from one another.

Figure 1:
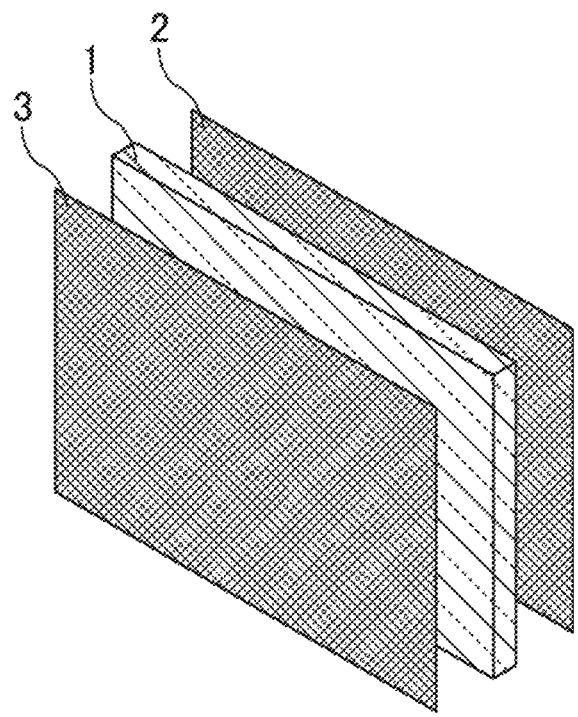
FIG. 1 is an exploded perspective view of a dimming panel of Embodiment 1.

FIG. 1 is an exploded perspective view of a dimming panel of Embodiment 1. As shown in FIG. 1, a dimming panel 1 may be sandwiched between a first polarizing plate 2 and a second polarizing plate 3. The first polarizing plate 2 and the second polarizing plate 3 are, for example, linear polarizing plates and are arranged with their absorption axes being perpendicular to each other.

Figure 2:
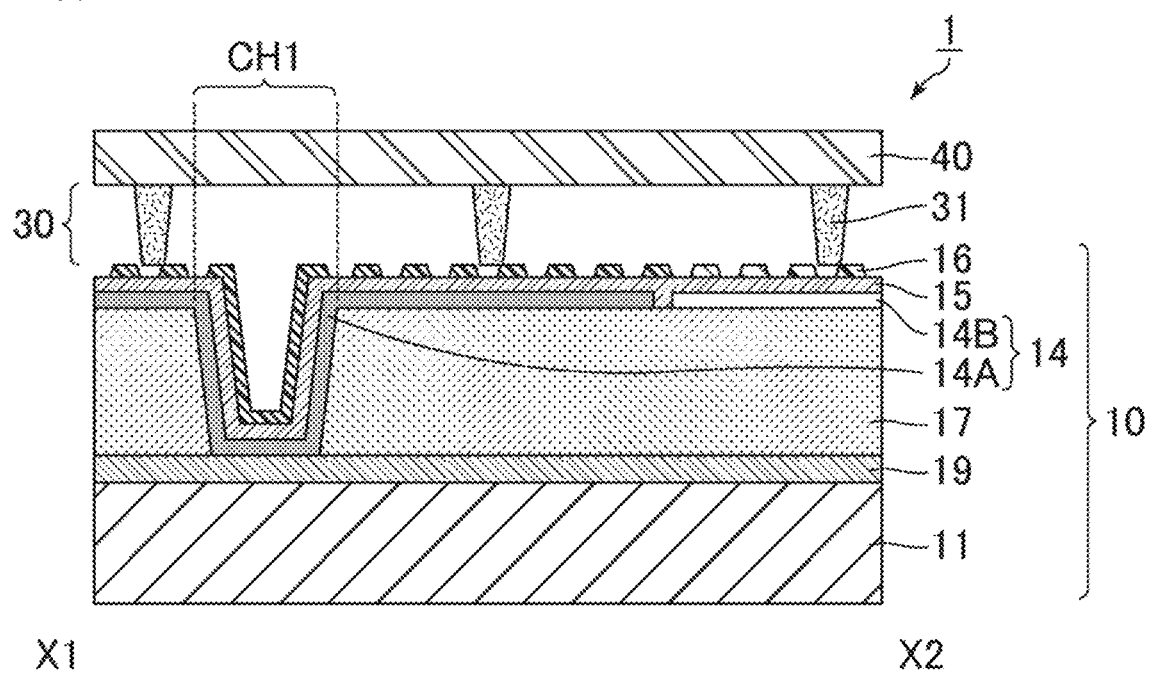
FIG. 2 is a schematic cross-sectional view of the dimming panel of Embodiment 1.
Figure 3:
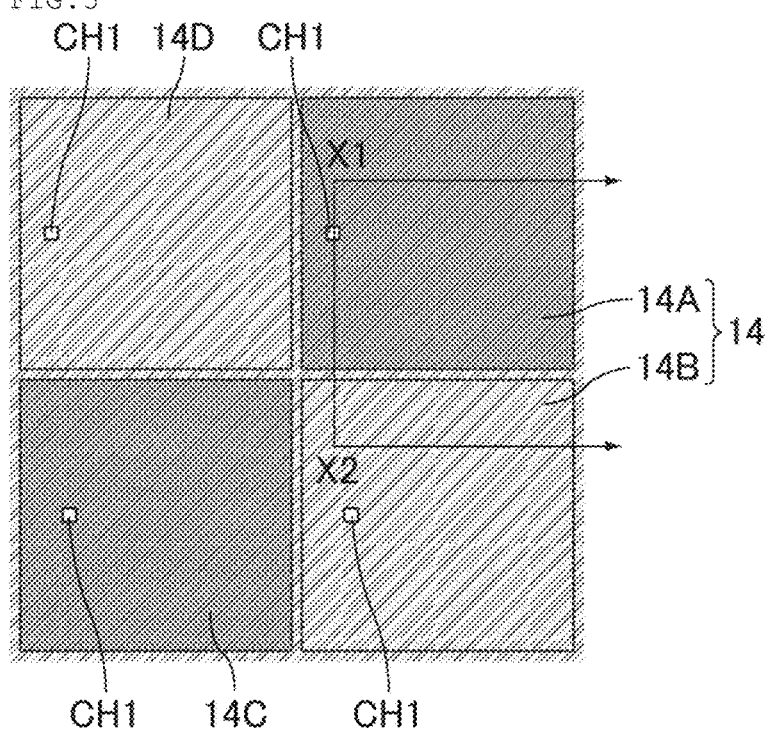
FIG. 3 is a partially enlarged schematic plan view of the dimming panel of Embodiment 1.

FIG. 2 is a schematic cross-sectional view of the dimming panel of Embodiment 1. FIG. 3 is a partially enlarged schematic plan view of the dimming panel of Embodiment 1. FIG. 2 is a schematic cross-sectional view taken along line X1-X2 in FIG. 3. As shown in FIG. 2, the dimming panel 1 sequentially includes a first substrate 10, a liquid crystal layer 30, and a second substrate 40. The first substrate 10 sequentially includes an insulating substrate 11, a first electrode 14, a first insulator layer 15, and a second electrode 16.

The dimming panel 1 is a horizontal alignment mode dimming panel and has excellent viewing angle characteristics, thus being suitable for a large liquid crystal display device required to have high display quality, such as a master monitor.

The insulating substrate 11 and the second substrate 40 are support substrates for holding the liquid crystal layer 30 in between, and are insulating substrates such as glass plates or plastic plates, e.g., polycarbonate plates. Although not shown, an alignment film that defines the initial alignment azimuth of liquid crystal molecules may be placed between the first substrate 10 and the liquid crystal layer 30 and between the second substrate 40 and the liquid crystal layer 30. The first insulator layer 15 may be any insulating layer that can insulate between the first electrode 14 and the second electrode 16. The first insulator layer 15 may be, for example, a silicon oxide film or a silicon nitride film.

The dimming panel 1 includes dimming units arranged in the in-plane direction. The dimming units are units for controlling the amount of light passing through the dimming panel. In a plan view, regions with the respective first dimming electrodes are dimming units. As shown in FIG. 3, in Embodiment 1, the first electrode 14 includes first dimming electrodes 14A, 14B, 14C, and 14D arranged in the respective dimming units. The first dimming electrodes 14A, 14B, 14C, and 14D may each be, for example, a planar electrode having a shape such as a triangle, a quadrilateral, or a hexagon. Examples of the triangle include equilateral triangles, isosceles triangles, and right triangles. Examples of the quadrilateral include squares, rectangles, and rhombuses. The first dimming electrodes may be formed from a transparent conductive material such as indium tin oxide (ITO) or indium zinc oxide (IZO).

As shown in FIG. 2, the first substrate 10 may include connection lines 19 between the first dimming electrodes and the insulating substrate 11. The dimming panel 1 includes a drive circuit 50. The first dimming electrodes may be connected to the drive circuit 50 through the respective connection lines 19. Specifically, each of the first dimming electrodes may be electrically connected to one of the connection lines 19 between a third insulator layer 17 and the insulating substrate 11 through a contact hole CH1 penetrating the third insulator layer 17 closer to the insulating substrate 11.

The liquid crystal layer 30 contains liquid crystal molecules. The anisotropy of dielectric constant ($\Delta\varepsilon$) of the liquid crystal molecules defined by the following formula may be positive (positive liquid crystal molecules) or negative (negative liquid crystal molecules). The liquid crystal material used for the liquid crystal layer of the dimming panel 1 may be the same as or different from the liquid crystal material used for the liquid crystal layer of the later-described image-providing liquid crystal panel. In order to improve the reliability, the liquid crystal material used for the liquid crystal layer of the dimming panel 1 preferably has better resistance to high temperature and high luminance than the liquid crystal material used for the liquid crystal layer of the image-providing liquid crystal panel. The liquid crystal layer 30 may be held between the first substrate 10 and the second substrate 40 with a predetermined thickness maintained by spacers 31 as shown in FIG. 2.

$$\Delta\varepsilon = \text{(dielectric constant in long axis direction of liquid crystal molecules)} - \text{(dielectric constant in short axis direction of liquid crystal molecules)} \quad (L)$$

Figure 4:
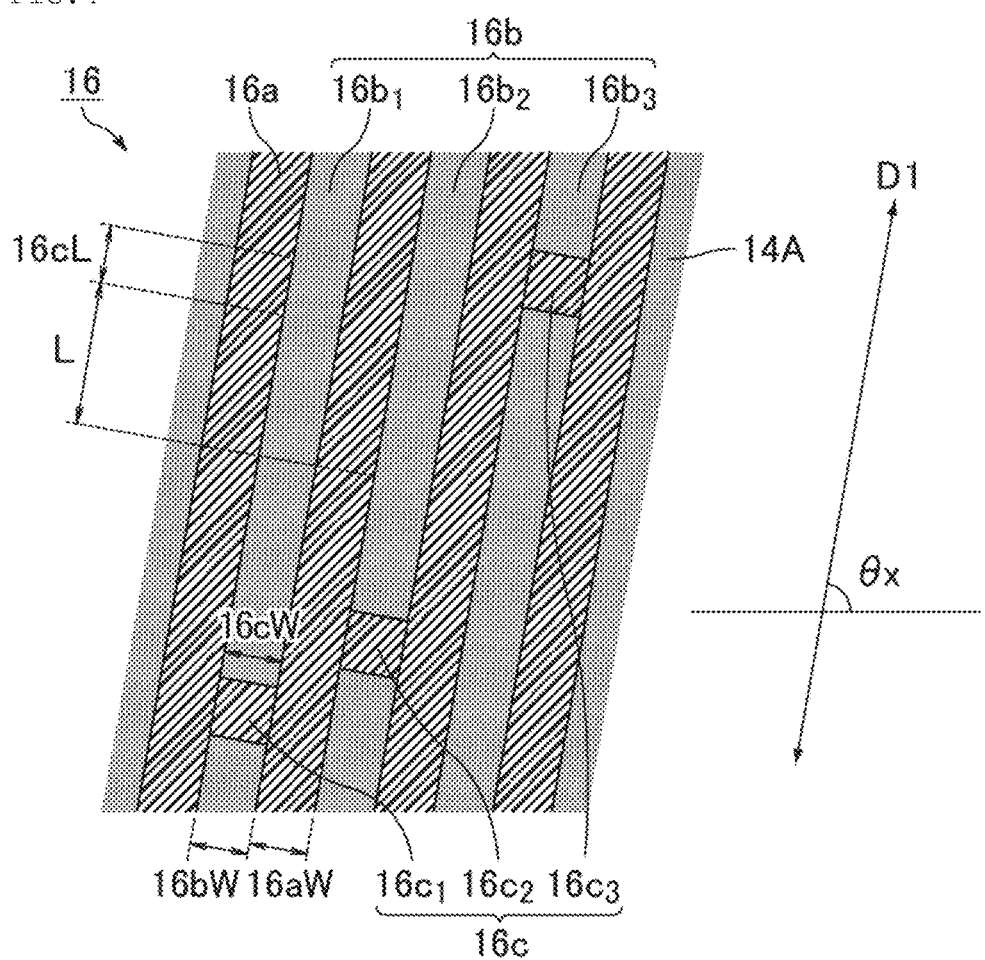
FIG. 4 is a first schematic plan view showing an arrangement pattern of bridge electrodes.

FIG. 4 is a first schematic plan view showing an arrangement pattern of bridge electrodes. FIG. 4 is also a partially enlarged view of a portion surrounded by the dotted line in the later-described FIG. 10. The second electrode 16 includes, as shown in FIG. 4, in a plan view, parallel linear electrodes 16a. Regions formed between the linear electrodes 16a are slit regions 16b. The second electrode 16 includes bridge electrodes each of which is disposed in one of the slit regions and is connecting two adjacent linear electrodes. The bridge electrodes connect two adjacent linear electrodes. With such a bridge electrode, the same voltage can be applied to the linear electrodes connected by the bridge electrode. The linear electrodes 16a may be in the respective dimming units or may extend over the entire dimming panel across the boundaries of the dimming units. Preferably, the second electrode 16 applies a certain voltage (constant voltage) to the entire dimming panel.

As shown in FIG. 4, a sit region adjacent to a first slit region $16b_1$ is a second slit region $16b_2$, and a slit region adjacent to the second slit region $16b_2$ is a third slit region $16b_3$. The bridge electrodes include a first bridge electrode $16c_1$ in the first slit region $16b_1$, a second bridge electrode $16c_2$ in the second slit region $16b_2$, and a third bridge electrode $16c_3$ in the third slit region $16b_3$. The first bridge electrode $16c_1$, the second bridge electrode $16c_2$, and the third bridge electrode $16c_3$ are discrete from one another.

Figure 5:
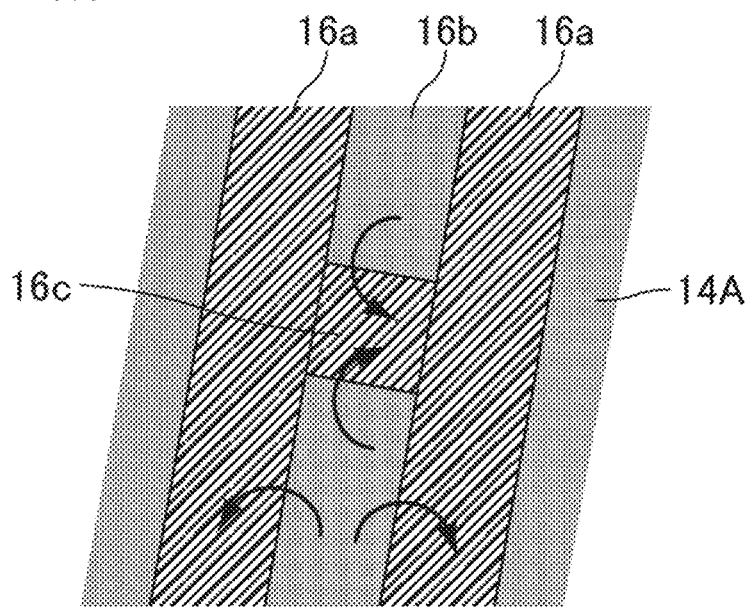
FIG. 5 is an enlarged schematic plan view of one of the bridge electrodes in FIG. 4.

FIG. 5 is an enlarged schematic plan view of one of the bridge electrodes in FIG. 4. In FIG. 5, the arrows indicate the directions of the electric fields. As shown in FIG. 5, the directions of the electric fields between the bridge electrode 16c and the first electrode (first dimming electrode 14A) are different from the directions of the electric fields between the linear electrodes 16a and the first dimming electrode 14A. Thus, the portion with the bridge electrode 16c is an misalignment region where the liquid crystal molecules are not aligned at the desired azimuth. Continuous misalignment regions are observed as a dark line. In view of this point, in Embodiment 1, the bridge electrodes are discrete from one another, so that the misalignment regions are dispersed. The bridge electrodes are therefore less likely to be observed as a dark line, which can improve the display quality of the dimming panel. This also leads to reduced occurrence of moiré even when the dimming panel is overlaid with the later-described image-providing liquid crystal panel.

With respect to the arrangement of the first bridge electrode $16c_1$, the second bridge electrode $16c_2$, and the third bridge electrode $16c_3$, the expression they are "discrete from one another" means that the three bridge electrodes are dispersed without being continuous in a specific direction. As shown in FIG. 4, the first bridge electrode $16c_1$, the second bridge electrode $16c_2$, and the third bridge electrode $16c_3$ are randomly dispersed. Preferably, at least the first bridge electrode $16c_1$ and the second bridge electrode $16c_2$ are not arranged in a straight line. The cases where they are not arranged in a straight line mean cases where, as shown in FIG. 4, the first bridge electrode $16c_1$ and the second bridge electrode $16c_2$ are arranged without overlapping in the length direction. Also, the cases where they are not in a straight line can mean cases where the first bridge electrode $16c_1$ and the second bridge electrode $16c_2$ are spaced by a distance greater than the length of a single bridge electrode in the extension direction of the linear electrodes 16a. In a frame region surrounding the outer edge of a region (also referred to as a dimming region) where light incident on the back surface of the dimming panel is emitted from the front surface of the dimming panel, dark lines are not observed by the viewer. Thus, bridge electrodes may be arranged continuously in a specific direction in the frame region.

Figure 6:
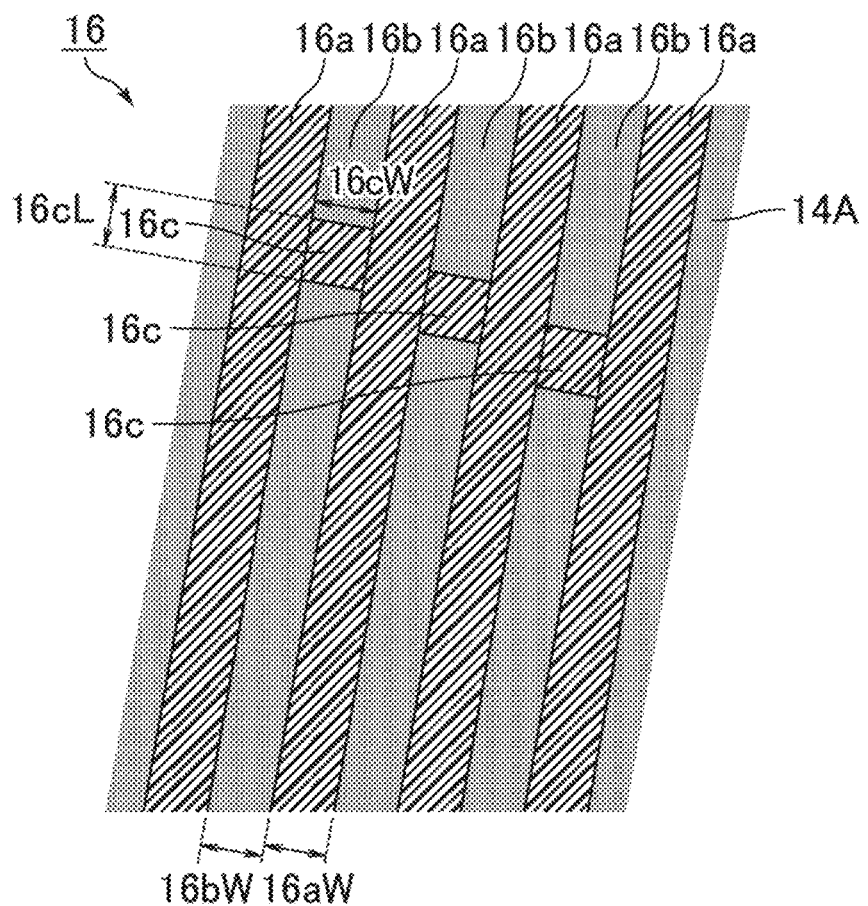
FIG. 6 is a second schematic plan view of an arrangement pattern of bridge electrodes.

The first bridge electrode $16c_1$, the second bridge electrode $16c_2$, and the third bridge electrode $16c_3$ only need to be discrete from one another, and the second electrode 16 may include bridge electrodes arranged in a straight line in adjacent regions to an extent that the bridge electrodes do not appear as a dark line. FIG. 6 is a second schematic plan view of an arrangement pattern of bridge electrodes. As shown in FIG. 6, the second electrode 16 includes bridge electrodes 16c arranged in adjacent slit regions and in a straight line, and the sum of the widths 16cW of the bridge electrodes 16c arranged in the adjacent slit regions and in a straight line may be 5 times or less the width 16aW of a single linear electrode 16a.

The "sum of the widths 16cW of the bridge electrodes" is the sum of only the widths 16cW of the bridge electrodes, excluding the width 16aW of the linear electrode 16a between the bridge electrodes 16c. The cases where the bridge electrodes 16c arranged in adjacent slit regions 16b are in a straight line mean cases where a selected bridge electrode in a single slit region and another bridge electrode in a slit region adjacent to the single slit region at least overlap each other in the length direction. Also, the cases where the bridge electrodes 16c are in a straight line can mean cases where the selected bridge electrode and the adjacent bridge electrode are spaced by a distance equal to or shorter than the length of a single bridge electrode in the extension direction of the linear electrodes 16a. In the frame region, the sum of the widths of the bridge electrodes arranged in a straight line may be more than 5 times the width of a single linear electrode.

With the sum of the widths 16cW of the bridge electrodes 16c arranged in adjacent slit regions and in a straight line being 5 times or less the width 16aW, the bridge electrodes 16c are less likely to be observed as a dark line and less likely to cause moiré even when the dimming panel is overlaid with the later-described image-providing liquid crystal panel. In contrast, with the sum of the widths 16cW of the bridge electrodes 16c arranged in adjacent slit regions and in a straight line being more than 5 times the width 16aW, the number of the bridge electrodes 16c arranged in a straight line is large and thus the misalignment regions are generated over a certain length or longer, which causes the bridge electrodes 16c to be observed as a dark line. In addition, the moiré is likely to occur. For example, when the sum of the widths 16cW of the bridge electrodes 16c arranged in adjacent slit regions and in a straight line is 7 times the width 16aW, a dark line and moiré are slightly visually observed and, when the sum is 10 times the width 16aW, a dark line and moiré are clearly observed. More preferably, the sum of the widths 16cW of the bridge electrodes 16c arranged in adjacent slit regions and in a straight line is 4 times or less the width 16aW.

Figure 7:
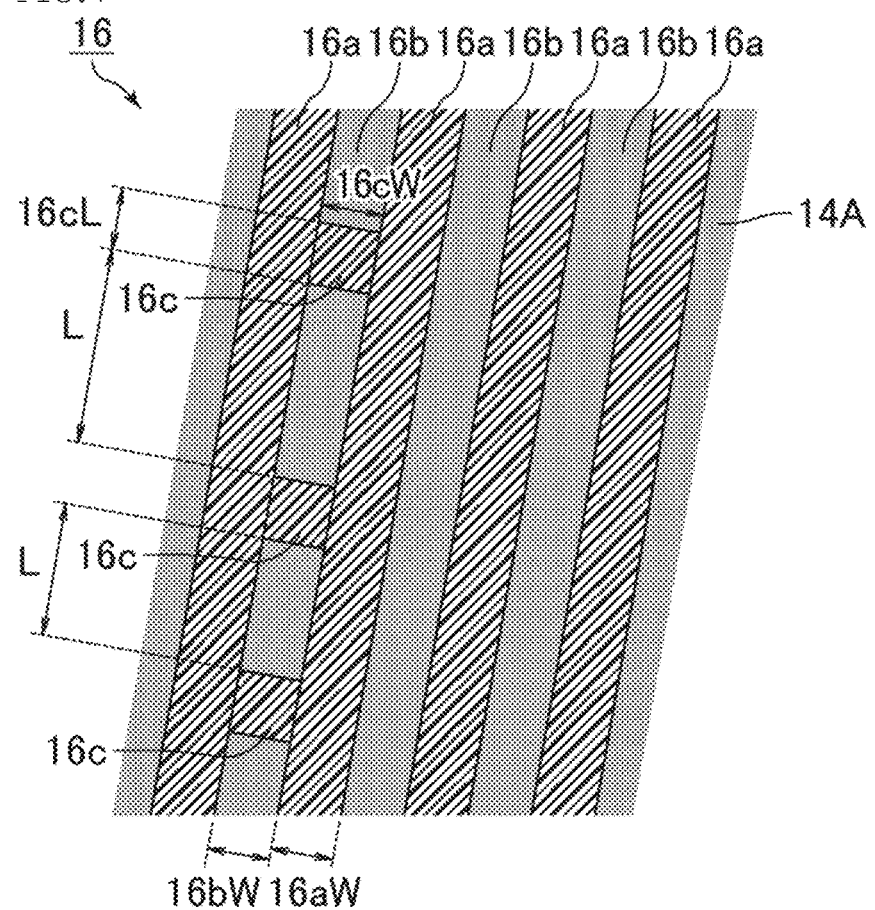
FIG. 7 is a third schematic plan view of an arrangement pattern of bridge electrodes.

Preferably, the first bridge electrode $16c_1$, the second bridge electrode $16c_2$, and the third bridge electrode $16c_3$ are discrete from one another, and at least two bridge electrodes are not continuously arranged in a single slit region. FIG. 7 is a third schematic plan view of an arrangement pattern of bridge electrodes. As shown in FIG. 7, cases where a distance L between the bridge electrodes in a single slit region is equal to or longer than the length 16cL of a single bridge electrode are considered to be cases where bridge electrodes are not continuously arranged in a single slit region.

Figure 8:
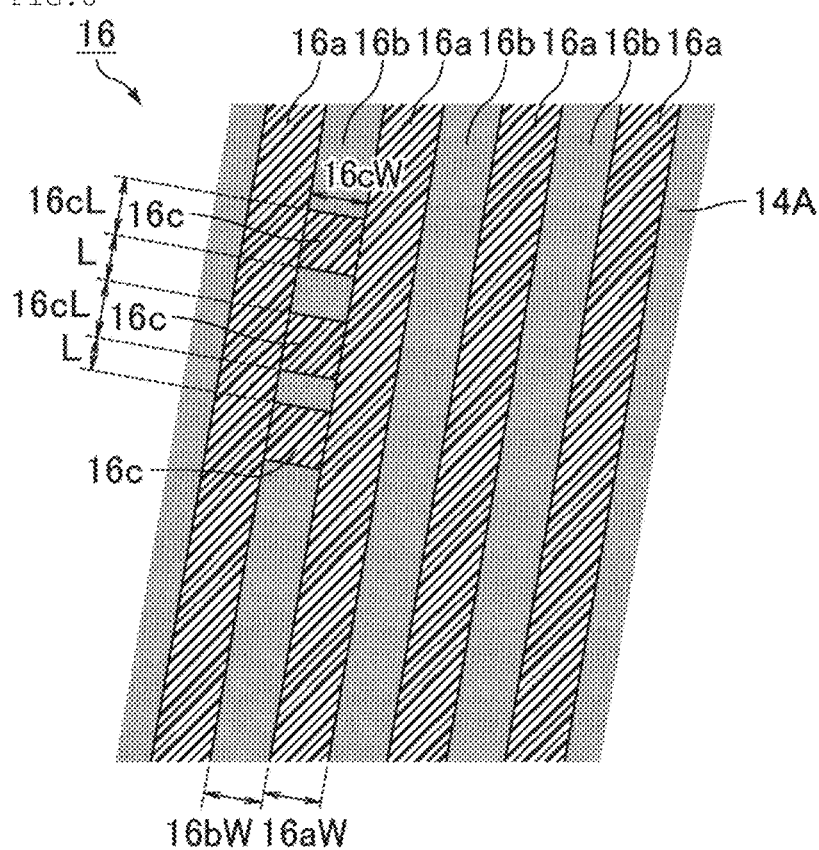
FIG. 8 is a fourth schematic plan view of an arrangement pattern of bridge electrodes.

The second electrode 16 may include the bridge electrodes 16c continuously arranged in a single slit region 16b to an extent that the bridge electrodes do not appear as a dark line. FIG. 8 is a fourth schematic plan view of an arrangement pattern of bridge electrodes. As shown in FIG. 8, the second electrode 16 may include the bridge electrodes 16c continuously arranged in a single slit region 16b, and the sum of the lengths 16cL of the bridge electrodes 16c continuously arranged in the single slit region 16b may be 5 times or less the width 16aW of a single linear electrode. When the bridge electrodes 16c are continuously arranged in a single slit region 16b, the continuously arranged bridge electrodes 16c may not be in contact with each other as long as the distance L between the bridge electrodes 16c in the single slit region 16b is shorter than the length 16cL of either one of adjacent bridge electrodes.

Even when the bridge electrodes 16c are continuously arranged in a single slit region 16b, with the sum of the length 16cL of the continuously arranged bridge electrodes 16c being 5 times or less the width 16aW, the bridge electrodes 16c are less likely to be observed as a dark line and less likely to cause moiré even when the dimming panel is overlaid with the later-described image-providing liquid crystal panel. In contrast, with the sum of the lengths 16cL of the continuously arranged bridge electrodes 16c being more than 5 times the width 16aW, the number of the bridge electrodes 16c arranged in a single slit region 16b is large and thus the misalignment regions are generated side by side over a certain length or longer, which causes the bridge electrodes 16c to be observed as a dark line. In addition, the moiré is likely to occur. For example, when the sum of the lengths 16cL of the bridge electrodes 16c continuously arranged in the single slit region 16b is 7 times the width 16aW, a dark Aline and moiré are slightly visually observed and, when the sum is 10 times the width 16aW, a dark line and moiré are clearly observed. More preferably, the sum of the lengths 16cL of the bridge electrodes 16c continuously arranged in the single slit region 16b is 4 times or less the width 16aW.

Preferably, the width 16aW of each of the linear electrodes 16a is 1 μm or greater and 5 μm or smaller. The lower limit of the width 16aW of each of the linear electrodes 16a is more preferably 2 μm, while the upper limit thereof is more preferably 4 μm. The width 16aW is the width of a linear electrode 16a in the direction perpendicular to the extension direction of the linear electrodes 16a.

As shown in FIG. 4, when the extension direction of the linear electrodes 16a is defined as D1 and the angle formed by D1 and the absorption axis of one of the first polarizing plate 2 and the second polarizing plate 3 which hold the dimming panel 1 in between is defined as θx, then θx may be 75° or greater and 85° or smaller.

Preferably, the width 16bW of each of the slit regions 16b is 1 μm or greater and 5 μm or smaller. The lower limit of the width 16bW of each of the slit regions 16b is more preferably 2 μm, while the upper limit thereof is more preferably 4 μm. The width 16bW is the width of a slit region 16b in the direction perpendicular to the slit regions 16b.

When the length of a bridge electrode perpendicular to the extension direction of the linear electrodes is defined as the width of the bridge electrode, the width of the bridge electrode is preferably 1 μm or greater and 5 μm or smaller. The lower limit of the width of the bridge electrode is more preferably 2 μm, while the upper limit thereof is more preferably 4 μm. The width of the bridge electrode is preferably equal to or greater than the width of the slit region in which the bridge electrode is disposed.

When the length of a bridge electrode along the linear electrodes is defined as the length of the bridge electrode, the length of the bridge electrode is preferably 1 μm or greater and 5 μm or smaller. The lower limit of the length of the bridge electrode is more preferably 2 μm, while the upper limit thereof is more preferably 4 μm.

The linear electrodes 16a and the bridge electrodes 16c are preferably formed from a transparent conductive material such as ITO or IZO.

In Embodiment 1, a case is described where the drive circuit 50 controls the voltages to be applied to the respective first dimming electrodes and applies a constant voltage to the second electrode 16. Application of the constant voltage to the second electrode may be achieved by applying a predetermined voltage as a reference or grounding the second electrode.

Hereinafter, the dimming method for the dimming panel is described. When a constant voltage is applied to the second electrode 16 and predetermined voltages are applied to the first dimming electrodes by the drive circuit 50, electric fields are generated in the liquid crystal layer 30. Since the second electrode 16 includes the parallel linear electrodes 16a, fringe electric fields are generated between the first dimming electrodes and the linear electrodes 16a, and the fringe electric fields change the alignment azimuth of the liquid crystal molecules in the liquid crystal layer 30. The alignment azimuth of the liquid crystal molecules forms an angle with the absorption axes of the paired linear polarizing plates, which controls the amount of light (for example, backlight illumination) passing through each dimming unit of the dimming panel to provide grayscale display.

Figure 9:
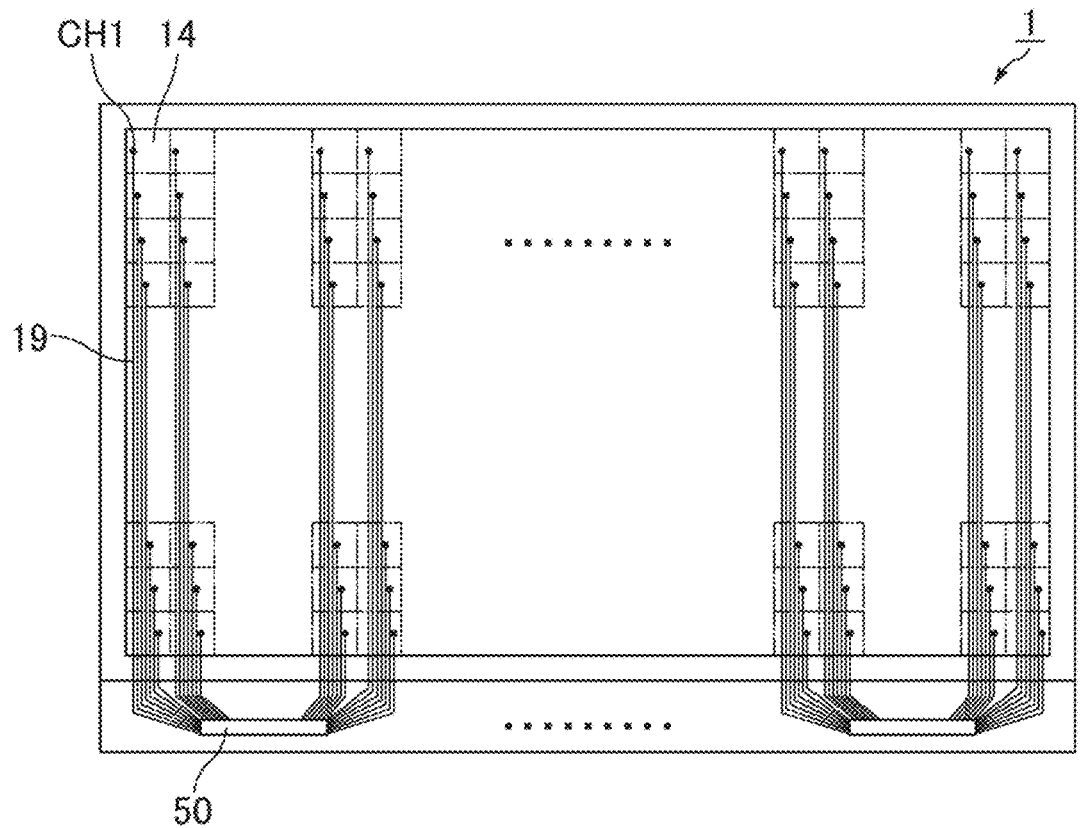
FIG. 9 is a schematic plan view of an example of a method of driving the dimming panel of Embodiment 1.

FIG. 9 is a schematic plan view of an example of a method of driving the dimming panel of Embodiment 1. As shown in FIG. 9, the first dimming electrodes 14 may be arranged in the row direction and the column direction in the plane of the dimming panel 1. The first substrate 10 may include the connection lines 19 that connect the respective first dimming electrodes 14 to the drive circuit 50. In other words, preferably, the first dimming electrodes 14 are driven by the segment system in which the first dimming electrodes 14 are connected to the drive circuit 50 through the respective connection lines 19 and the voltages to be applied to the respective first dimming electrodes 14 are controlled. The other possible driving systems include the matrix driving system in which a switching element such as a thin film transistor (TFT) is disposed in each dimming unit and the voltages to be applied to the first electrodes (first dimming electrodes) for the respective dimming units are controlled. Unlike the matrix driving system, the segment system allows the first dimming electrodes to be charged for a period of one frame. This enables sufficient electrical charging in the segment system even when the connection lines 19 are made of a transparent conductive material such as ITO or IZO which have a lower degree of electrical conductivity than metal materials having a high degree of electrical conductivity and preferred in the matrix driving system, such as copper, aluminum, titanium, or molybdenum. Also, since including no TFTs, a dimming panel based on the segment system does not cause a decrease in reliability due to shifting of the threshold voltage of the TFTs.

The connection lines 19 may be made of a transparent conductive material such as ITO or IZO. Here, when the connection lines 19 are metal lines made of any of the metal materials above, the transmittance of the dimming panel may decrease. In addition, when such a panel is overlaid with the later-described image-providing liquid crystal panel, the metal lines may interfere with the conductive lines such as the gate lines and the source lines as well as the black matrix, for example, in the image-providing liquid crystal panel to cause moiré. In order to reduce or prevent occurrence of moiré, a diffusion sheet is typically disposed between the image-providing liquid crystal panel and the dimming panel. The diffusion sheet, however, further decreases the transmittance of the liquid crystal display device. In view of these issues, transparent electrodes are used as the connection lines to increase the transmittance of the dimming panel and reduce or prevent occurrence of the moiré. In addition, such a structure eliminates the need for a diffusion sheet to reduce or prevent occurrence of moiré, and thus the transmittance of the liquid crystal display device can also be increased. As shown in FIG. 9, the first dimming electrodes 14 arranged in the column direction may be arranged with the positions of the contact holes CH1 shifted in the row direction. The drive circuit 50 may be disposed in the frame region surrounding the outer edge of the dimming region where the dimming units are arranged.

The dimming panel may be disposed between the image-providing liquid crystal panel and the backlight, as a component of a liquid crystal display device. The dimming panel call also be used alone as an anti-panel which controls the transmission amount of external light. Examples of the anti-glare panel include sun visors for vehicles.

Embodiment 2

Embodiment 2 relates to a production method for a dimming panel. The production method for a dimming panel of Embodiment 2, the dimming panel sequentially including: a first substrate; a liquid crystal layer; and a second substrate, the first substrate sequentially including an insulating substrate, a first electrode, a first insulator layer, and a second electrode, the second electrode including, in a plan view, linear electrodes parallel to each other with slit regions in between, and bridge electrodes each of which is disposed in one of the slit regions and is connecting two adjacent linear electrodes; the slit regions including a first slit region and a second slit region adjacent to the first slit region, the bridge electrodes including a first bridge electrode in the first slit region and a second bridge electrode in the second slit region, the production method including: setting bridge formation sites 1 to n in each of the slit regions having a certain length X, each of the bridge formation sites having a length obtained by equally dividing the length X by n, where n is an integer; forming the first bridge electrode at a bridge formation site selected from the bridge formation sites 1 to n of the first slit region; and forming the second bridge electrode at a differently numbered bridge formation site from the bridge formation site of the second slit region where the first bridge electrode is formed.

Figure 10:
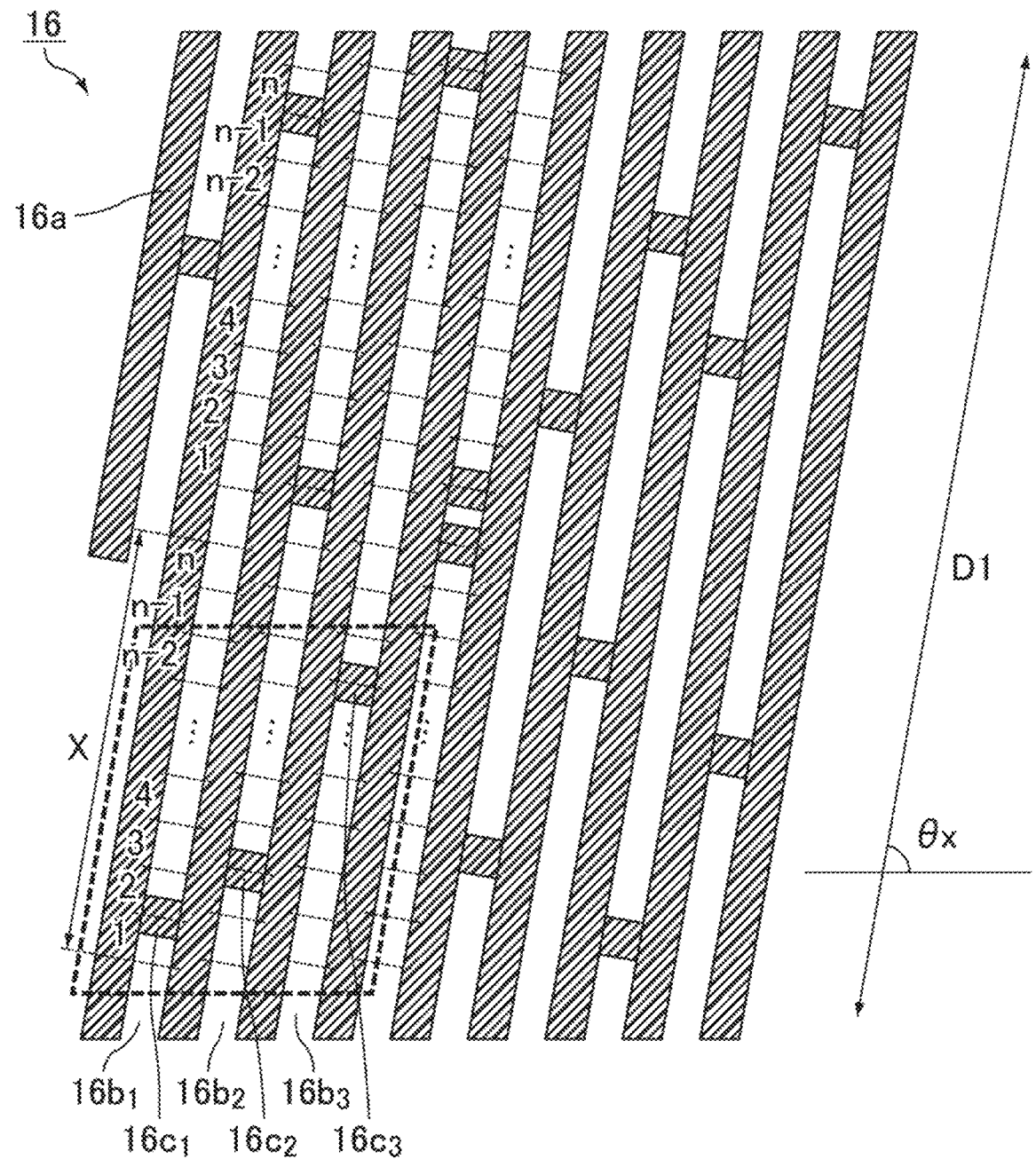
FIG. 10 is a schematic plan view of a second electrode, showing a method of arranging bridge electrodes in Embodiment 2.

Hereinafter, the arrangement method for the bridge electrodes is described with reference to FIG. 10. FIG. 10 is a schematic plan view of a second electrode, showing a method of arranging bridge electrodes in Embodiment 2. A certain length X is taken for the slit regions 16b, and the length X is equally divided by n, where n is an integer, to set the bridge formation sites 1 to n. The first bridge electrode $16_{c1}$ is disposed at a bridge formation site selected from the bridge formation sites 1 to n set in the first slit region $16_{b1}$, and the second bridge electrode $16_{c2}$ is disposed at a bridge formation site selected from the bridge formation sites 1 to n set in the second slit region $16_{b2}$. At this time, the first bridge electrode $16_{c1}$ and the second bridge electrode $16_{c2}$ are disposed at differently numbered bridge formation sites. The first bridge electrode $16_{c1}$ and the second bridge electrode $16_{c2}$ are each disposed at a bridge formation site randomly selected from the bridge formation sites 1 to n using a random coefficient in calculation software such as Excel®, for example.

Preferably, the bridge electrodes are not arranged at consecutively numbered bridge formation sites in each of the slit regions. For example, when multiple bridge electrodes are arranged in a single slit region $16_{b1}$, not arranging bridge electrodes at consecutively numbered bridge formation sites over the certain length X allows dispersion of the misalignment regions.

Figure 11:
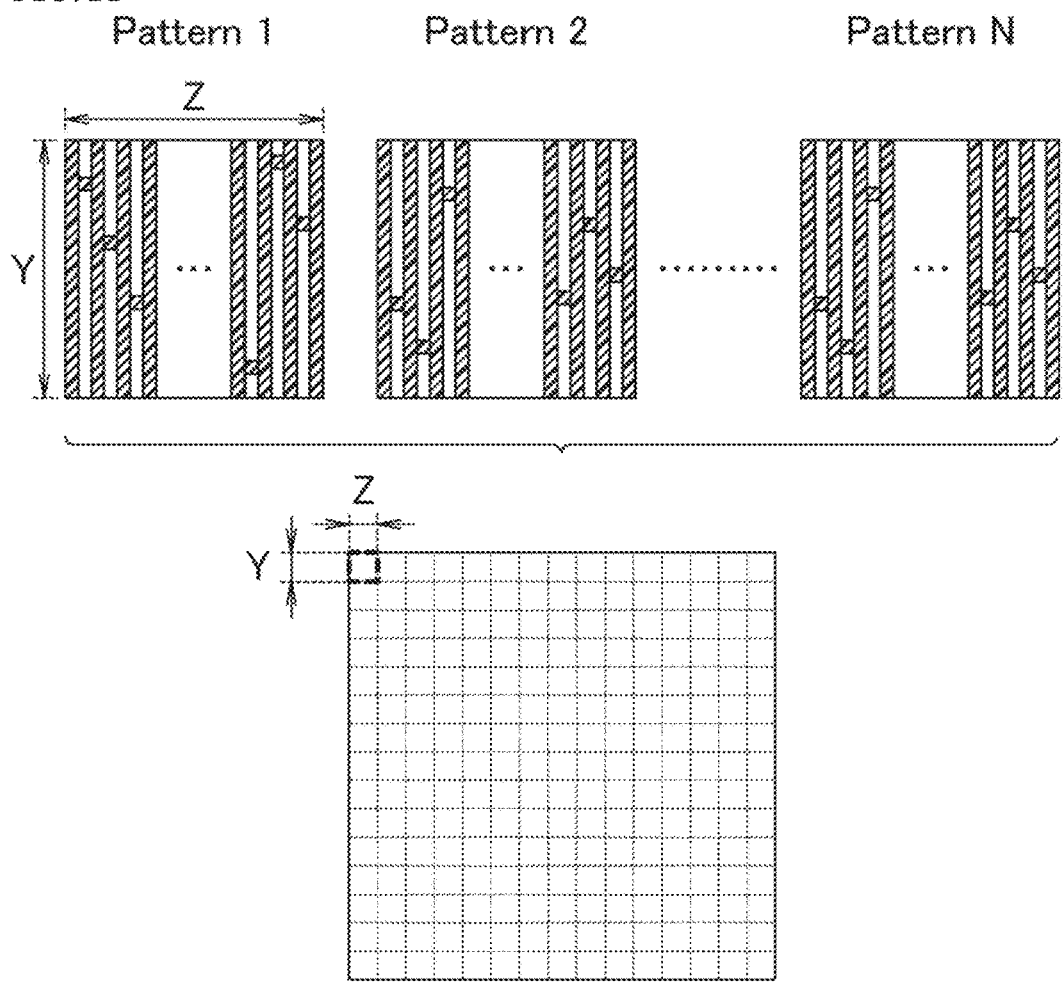
FIG. 11 is a schematic view showing a method of arranging bridge electrodes when multiple arrangement patterns are combined in Embodiment 2.

The method above may be used to determine the arrangement pattern of the bridge electrodes 16c throughout the entire dimming panel 1 or, as shown in FIG. 11, multiple arrangement patterns formed in advance may be combined. FIG. 11 is a schematic view showing a method of arranging bridge electrodes when multiple arrangement patterns are combined in Embodiment 2. As shown in FIG. 11, the bridge electrodes 16c may be arranged by dividing the dimming panel 1 into lengths Y in the vertical direction and lengths Z in the horizontal direction, creating arrangement patterns 1 to N (wherein N is an integer) of the bridge electrodes 16c for a single length Y×width Z region, and setting the patterns 1 to N randomly throughout the dimming panel 1.

The second electrode 16 including the linear electrodes 16a and the bridge electrodes 16c can be formed by forming a conductive film using a conductive material on an insulating substrate, and patterning the conductive film according to the arrangement pattern(s) determined above. The conductive material is preferably a transparent conductive material such as ITO or IZO.

Embodiment 3

A dimming panel 101 of Embodiment 3 has the same structure as in Embodiment 1, except that the first electrodes (first dimming electrodes) have a different structure. In the dimming panel 101 of Embodiment 3, the first substrate further includes, between the insulating substrate and the first electrode, sequentially from the insulating substrate, a lower-layer electrode and a second insulator layer, each of the first dimming electrodes includes island electrodes spaced from one another in a plan view and electrically connected to one another, and at least one of the island electrodes is electrically connected to the lower-layer electrode through a contact hole.

In Embodiment 3, the shapes of the electrodes can be freely designed as long as a structure is employed in which a constant voltage is applied to the second electrode including linear electrodes while predetermined voltages are applied to the first dimming electrodes in the respective dimming units, so that the second electrode and the first dimming electrodes can form electric fields. Thus, the first electrodes (first dimming electrodes) can have a complicated electrode shape including island electrodes.

Figure 12:
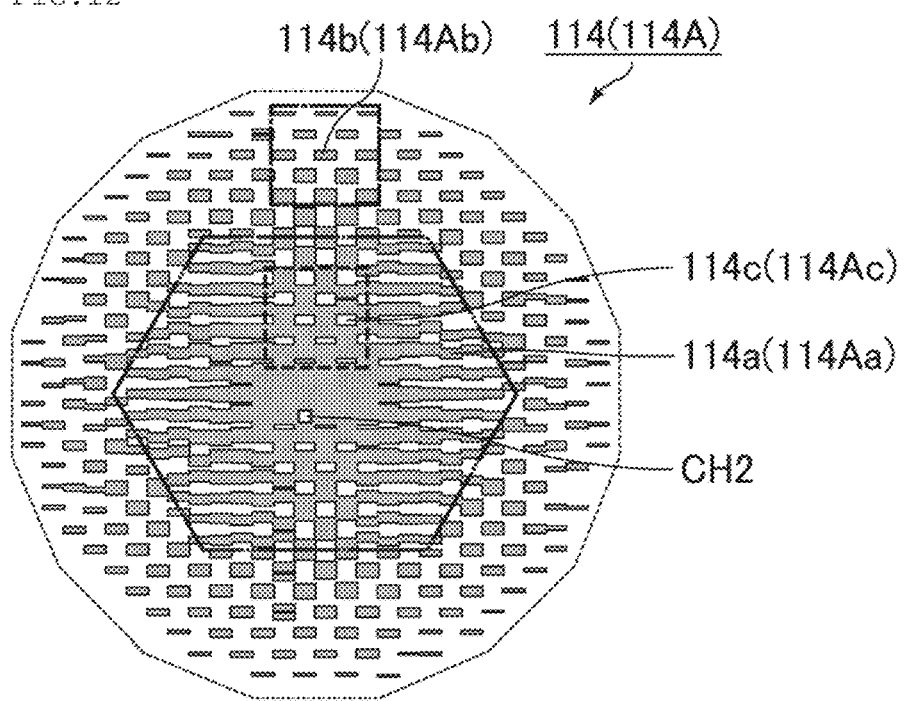
FIG. 12 is a schematic plan view of a single first dimming electrode in a dimming panel of Embodiment 3.

In Embodiment 3, first electrodes 114 (114A) include first dimming electrodes 114 (114A). FIG. 12 is a schematic plan view of a single first dimming electrode in a dimming panel of Embodiment 3. Each of the first dimming electrodes 114 may include island electrodes 114b (114Ab) which are spaced from one another in a plan view and electrically connected to one another. According to the studies made by the present inventors, depending on the shape of the first dimming electrodes in the respective dimming units, the luminance distribution across the dimming units is not smooth. This may produce a significant luminance difference between the dimming units to cause the shape of the dimming units to be recognized when the grayscale values between adjacent dimming units in display are different. Thus, with each of the first dimming electrodes including island electrodes spaced from one another in a plan view and electrically connected to one another, a change in grayscale distribution between adjacent dimming units can be made smooth.

The first dimming electrodes 114 may each further include a base electrode 114a (114Aa) provided with apertures 114c (114Ac). The base electrode 114a may be disposed at the center of a single dimming unit, or may be disposed with the center of the base electrode 114a aligned with the center of the first dimming electrode 114. FIG. 12 shows a case where the planar shape of at least one of the island electrodes 114b is quadrilateral and the outer edge shape of at least one of the apertures 114c is also quadrilateral.

The island electrodes 114b may surround the base electrode 114a in a plan view. With the island electrodes 114b surrounding the base electrode 114a in a plan view, spreading of light passing through each dimming unit can be adjusted.

The planar shape of at least one of the island electrodes 114b may include a linear portion and may be, for example, a quadrilateral such as a rectangle, a square, or a rhombus. Also, the planar shape of at least one of the island electrodes 114b may include a curved portion and may be, for example, a circle or an oval. In addition, the planar shape of at least one of the island electrodes 114b may be a combined shape of a linear portion and a curved portion. The planar shape of at least one of the island electrodes 114b may be designed to match the planar shape of the pixels defining the later-described image-providing liquid crystal panel.

The outer edge shape (the planar shape of the outer edge in a plan view) of at least one of the apertures 114c may be any shape that allows at least one of the island electrodes 114b to be disposed inside the aperture 114c. The outer edge shape of at least one of the apertures 114c may include a linear portion and may be, for example, a quadrilateral such as a rectangle, a square, or a rhombus. Also, the outer edge shape of at least one of the apertures 114c may include a curved portion and may be, for example, a circle or an oval. In addition, the outer edge shape of at least one of the apertures 114c may be a combined shape of a linear portion and a curved portion. The outer edge shape of at least one of the apertures 114c may be designed to match the planar shape of the pixels defining the later-described image-providing liquid crystal panel.

In FIG. 12 and the later-described FIG. 13, each portion surrounded by a dashed and double-dotted line shows an arrangement region for determining the approximate position of a base electrode 114a, in arranging the first dimming electrodes 114 in the plane of the dimming panel. The outer edge shape of each arrangement region may differ from the outer edge shape of the base electrodes 114a. The outer edge shape of each arrangement region is preferably a shape that allows the arrangement regions to be laid out on a planar surface. The outer edge shape of the arrangement region may be a triangle, a quadrilateral, or a hexagon, for example. Examples of the triangle include equilateral triangles, isosceles triangles, and right triangles. Examples of the quadrilateral include squares, rectangles, and rhombuses. The outer edge shape of the arrangement regions is preferably a regular polygon for smoother changes in luminance distribution. Suitable examples thereof include regular triangles, squares, and regular hexagons.

The island electrodes 114b may be arranged such that their electrode area decreases in a concentric circle pattern from the center of the base electrode 114a toward the outer edge of the first electrode 114. The apertures 114c may be formed such that their aperture area increases in a concentric circle pattern from the center of the base electrode 114a toward the outer edge of the first electrode 114. The outer edge of the base electrode 114a may not be formed by straight lines, and may include an irregular portion.

The island electrodes 114b may have an electrode area occupancy decreasing toward the outer edge of the first dimming electrode 114. The electrode area occupancy means the proportion of the electrode area of the island electrodes 114b per unit area of a single dimming unit. With the island electrodes 114b having an electrode area occupancy decreasing toward the outer edge of the first dimming electrode 114 in a plan view, the first dimming electrode 114 can be controlled to have a luminance that is highest in the central portion of the first dimming electrode 114 and decreases gradually toward the outer edge of the first dimming electrode 114. The electrode area occupancy may be decreased by arranging the island electrodes 114b such that their electrode area decreases toward the outer edge of the first dimming electrode 114 or by reducing the number of the island electrodes 114b arranged toward the outer edge of the first dimming electrode 114. The outer edge of the first dimming electrode 114 means, when straight lines passing through the center of the first dimming electrodes 114 are set in a plan view, a line connecting the island electrodes 114b that are farthest from the center of the first dimming electrode 114 in the respective straight lines.

The apertures in the base electrode 114a may have an aperture area occupancy increasing from the center of the base electrode 114a (center of the first dimming electrode 114) toward the outer edge of the base electrode 114a. The aperture area occupancy means the proportion of the aperture area of the apertures per unit area of a single dimming unit.

Figure 13:
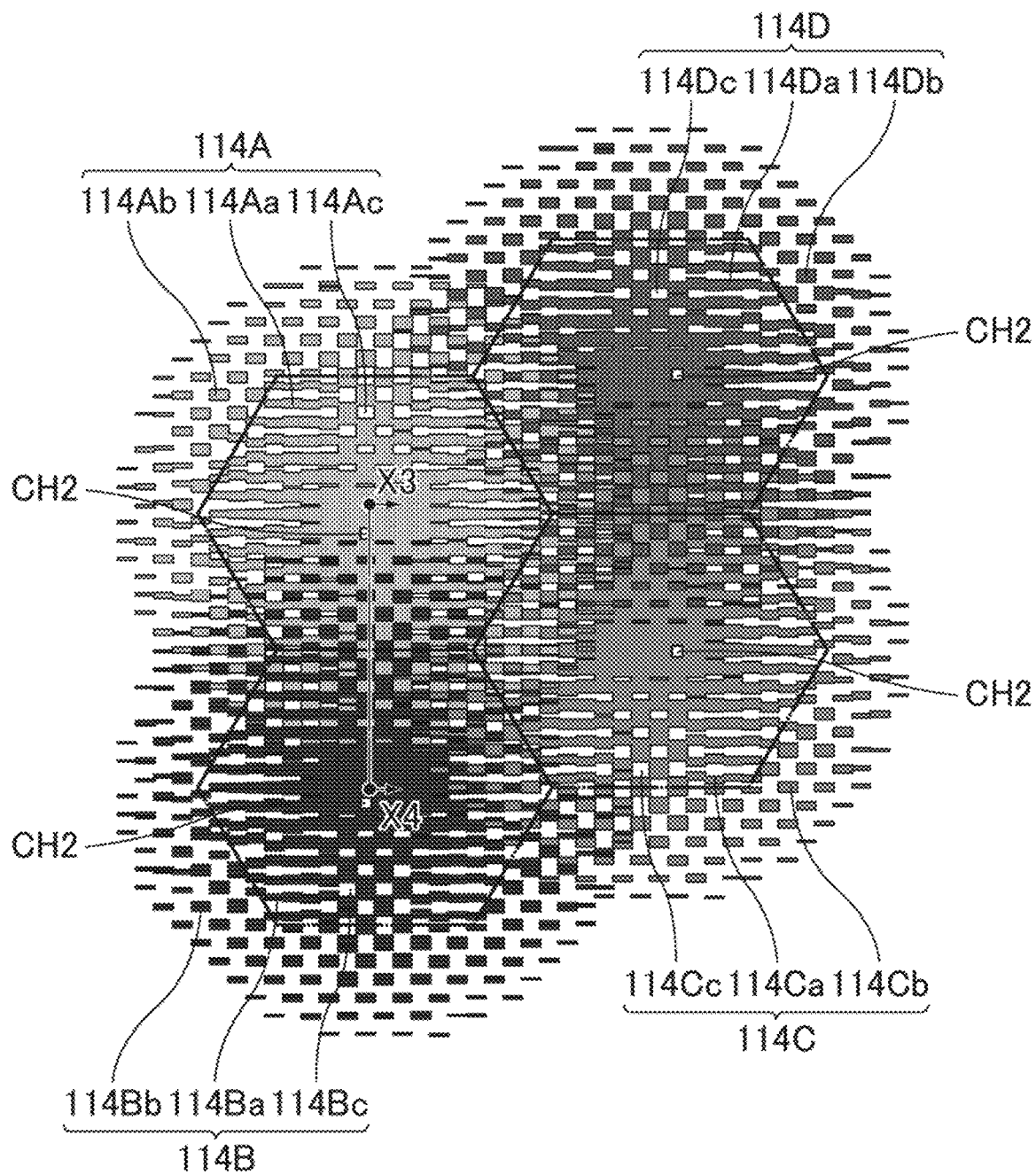
FIG. 13 is a schematic plan view of a dimming panel including four first dimming electrodes in FIG. 12.

FIG. 13 is a schematic plan view of a dimming panel including four first dimming electrodes in FIG. 12. FIG. 13 shows a case where the outer edge shape of the arrangement regions is a hexagon. When the outer edge shape of the arrangement regions is a hexagon, a single first dimming electrode is adjacent to six other first dimming electrodes with its six sides as boundaries. Arrangement of three first dimming electrodes 114B, 114C, and 114D among the six other first dimming electrodes adjacent to the first dimming electrode 114A is described with reference to FIG. 13. The first dimming electrodes 114B, 114C, and 114D respectively include base electrodes 114Ba, 114Ca, and 114Da and island electrodes 114Bb, 114Cb, and 114Db respectively surrounding the base electrodes 114Ba, 114Ca, and 114Da in a plan view. The base electrodes 114Ba, 114Ca, and 114Da are respectively provided with apertures 114Bc, 114Cc, and 114Dc.

The focus is now placed on the two adjacent first dimming electrodes 114A and 114B in FIG. 13. At least one of the island electrodes 114Ab of the first dimming electrode 114A may be disposed between the island electrodes 114Bb of the first dimming electrode 114B, and at least one of the island electrodes 114Bb of the first dimming electrode 114B may be disposed between the island electrodes 114Ab of the first dimming electrode 114A. This arrangement can make the changes in luminance distribution between adjacent first dimming electrodes smooth to make the boundaries between the dimming units less noticeable. This arrangement may be regarded as including an overlap between the region with the first dimming electrode 114A and the region with the first dimming electrode 114B.

The island electrodes are spaced from one another in a plan view. Being "spaced from one another" means that the island electrodes are arranged with a space in between without contact with one another on the same plane surface. With the island electrodes spaced from one another, at least one of the island electrodes 114Ab of the first dimming electrode 114A can be also disposed between the island electrodes 114Bb of the first dimming electrode 114B. Likewise, at least one of the island electrodes 114Bb can be also disposed between the island electrodes 114Ab.

The island electrodes 114Ab may have an electrode area occupancy decreasing from the center of the first dimming electrode 114A toward the center of the first dimming electrode 114B. The island electrodes 114Bb may have an electrode area occupancy decreasing from the center of the first dimming electrode 114B toward the center of the first dimming electrode 114A. Specifically, the electrode area or number of the island electrodes 114Ab may decrease from the center of the first dimming electrode 114A toward the center of the first dimming electrode 114B. The electrode area or number of the island electrodes 114Bb may decrease from the center of the first dimming electrode 114B toward the center of the first dimming electrode 114A.

The apertures 114Ac in the base electrode 114Aa of the first dimming electrode 114A may have an aperture area occupancy increasing from the center of the first dimming electrode 114A toward the center of the first dimming electrode 114B. The apertures 114Bc in the base electrode 114Ba of the first dimming electrode 114B may have an aperture area occupancy increasing from the center of the first dimming electrode 114B toward the center of the first dimming electrode 114A. Specifically, the aperture area or number of the apertures 114Ac may increase from the center of the first dimming electrode 114A toward the center of the first dimming electrode 114B. The aperture area or number of the apertures 114Bc may increase from the center of the first dimming electrode 114B toward the center of the first dimming electrode 114A.

With the apertures 114Ac and 114Bc provided respectively in the base electrodes 114Aa and 114Ba, at least one of the island electrodes 114Ab of the first dimming electrode 114A can also be disposed inside at least one of the apertures 114B in the base electrode 114Ba of the first dimming electrode 114B. Likewise, at least one of the island electrodes 114Bb of the first dimming electrode 114B can also be disposed inside at least one of the apertures 114Ac in the base electrode 114Aa of the first dimming electrode 114A.

At least one of the island electrodes 114Ab of the first dimming electrode 114A may be disposed inside at least one of the apertures 114Bc in the first dimming electrode 114B and between the island electrodes 114Bb of the first dimming electrode 114B, or inside at least one of the apertures 114Bc or between the island electrodes 114Bb. Likewise, at least one of the island electrodes 114Bb of the first dimming electrode 114B may be disposed inside at least one of the apertures 114Ac in the first dimming electrode 114A and between the island electrodes 114Ab of the first dimming electrode 114A, or inside at least one of the apertures 114Ac or between the island electrodes 114Ab.

Figure 14:
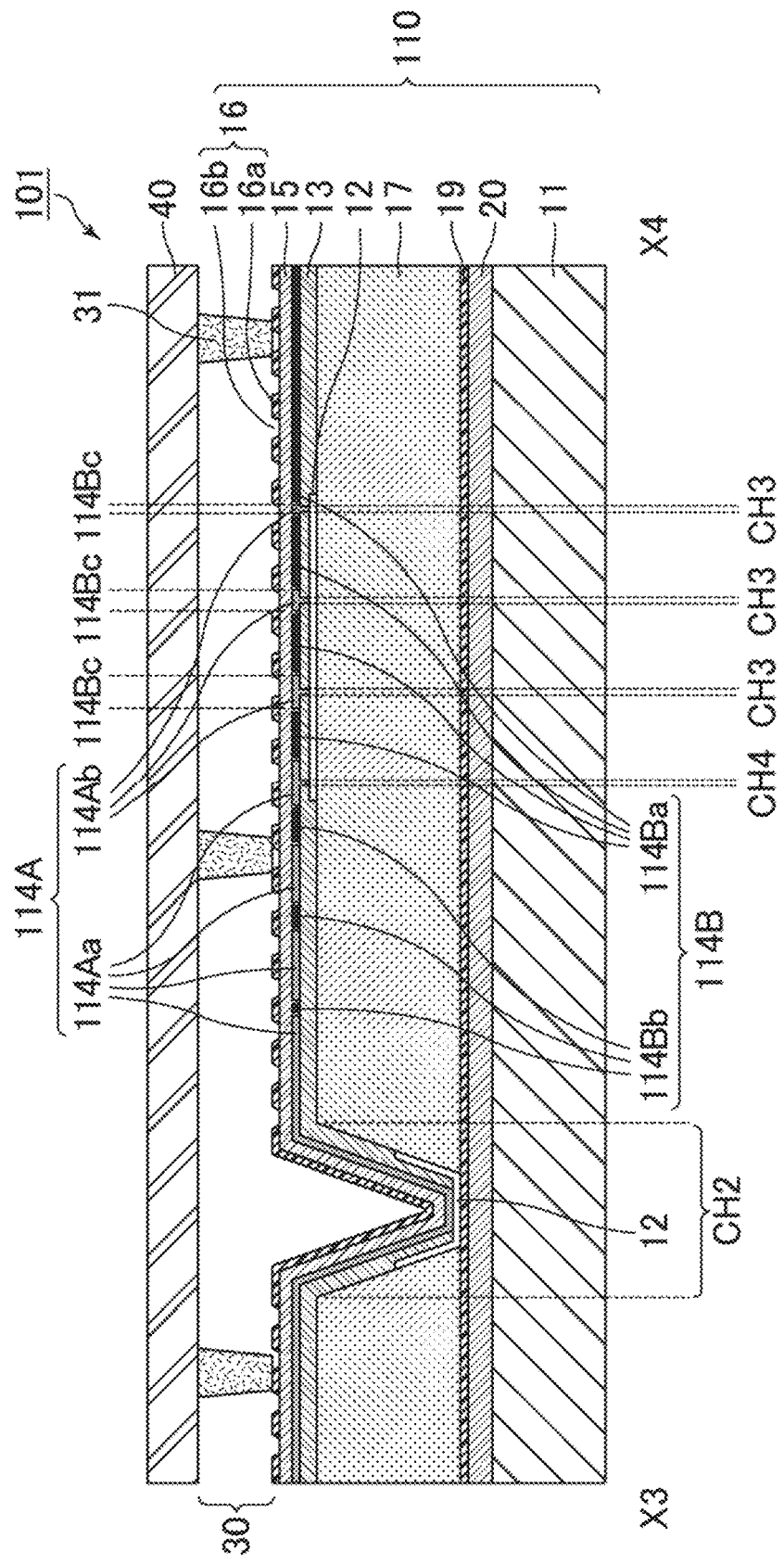
FIG. 14 is a schematic cross-sectional view of the dimming panel in FIG. 13.

The first substrate preferably further includes, between the insulating substrate and the first electrode, sequentially from the insulating substrate, a lower-layer electrode and a second insulator layer. FIG. 14 is a schematic cross-sectional view of the dimming panel in FIG. 13. As shown in FIG. 14, a first substrate 110 may sequentially include the insulating substrate 11, a lower-layer electrode 12, a second insulator layer 13, the first electrodes (first dimming electrodes) 114A and 114B, a first insulator layer 15, and the second electrode 16. The second insulator layer 13 may be any insulator layer that can insulate between the lower-layer electrode 12 and the first dimming electrodes (first dimming electrodes 114A and 114B). The second insulator layer 13 may be, for example, a silicon oxide film or a silicon nitride film.

As shown in FIG. 14, at least one of the island electrodes 114Ab is preferably electrically connected to the lower-layer electrode 12 through a contact hole CH3 penetrating the second insulator layer 13. The island electrodes 114Ab appear to be dotted with a space from one another in a plan view. Yet, the island electrodes 114Ab are electrically connected to one another by the lower-layer electrode 12, so that the same voltage can be applied to the island electrodes 114Ab of a single first dimming electrode. The island electrodes 114Ab may be electrically connected to the lower-layer electrode 12 through the contact holes CH3.

The base electrode 114Aa may be electrically connected to the lower-layer electrode 12 through a different contact hole CH4 penetrating the second insulator layer 13. In other words, at least one of the island electrodes 114Ab and the base electrode 114Aa may be electrically connect to each other by the lower-layer electrode 12.

The first dimming electrode 114A (in FIG. 14, base electrode 114Aa) may be electrically connected to one of the connection lines 19 between the third insulator layer 17 and the insulating substrate 11, through a contact hole CH2 penetrating the second insulator layer 13 and the third insulator layer 17 closer to the insulating substrate 11. The dimming panel includes the drive circuit 50 which controls the voltages to be applied to the respective first dimming electrodes 114, and the first dimming electrodes 114 may be connected to the drive circuit 50 through the respective connection lines 19. The lower-layer electrode 12 may be disposed at the connection portion of the first dimming electrode 114A and the corresponding connection line 19 in the contact hole CH2. A fourth insulator layer 20 may be disposed between the insulating substrate 11 and the lower-layer electrode 12. Although FIG. 14 shows a case where the base electrode 114Aa is electrically connected to the corresponding connection line 19 through the contact hole CH2, at least one of the island electrodes 114Ab may be electrically connected to the connection line 19 through the contact hole CH2.

Figure 15:
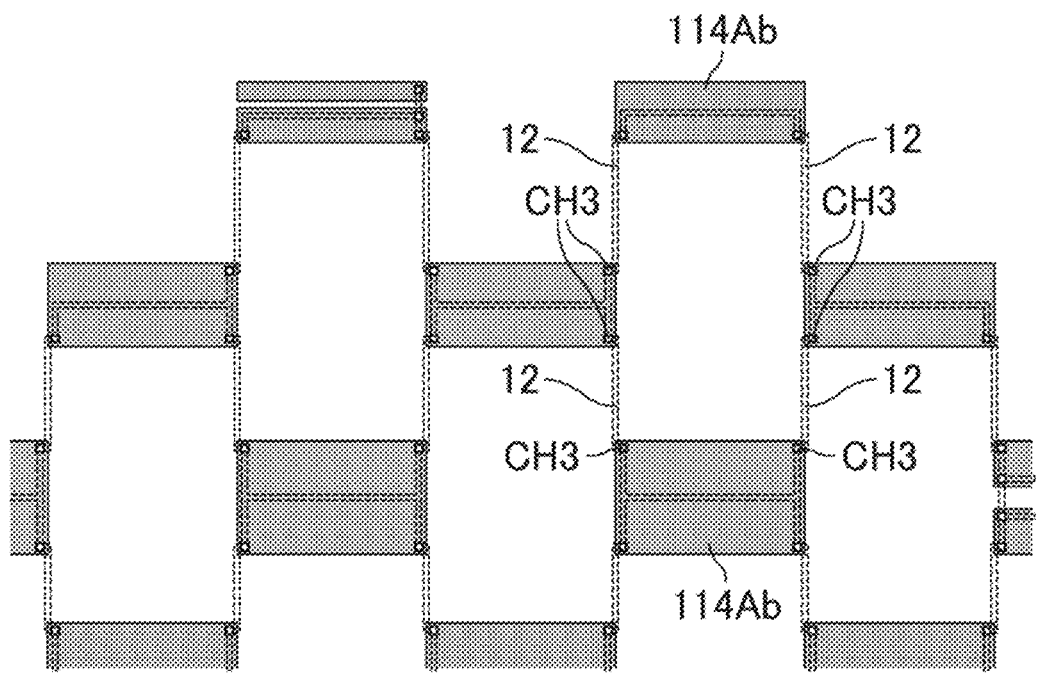
FIG. 15 is an example of a partially enlarged schematic plan view of the island electrodes in FIG. 12.
Figure 16:
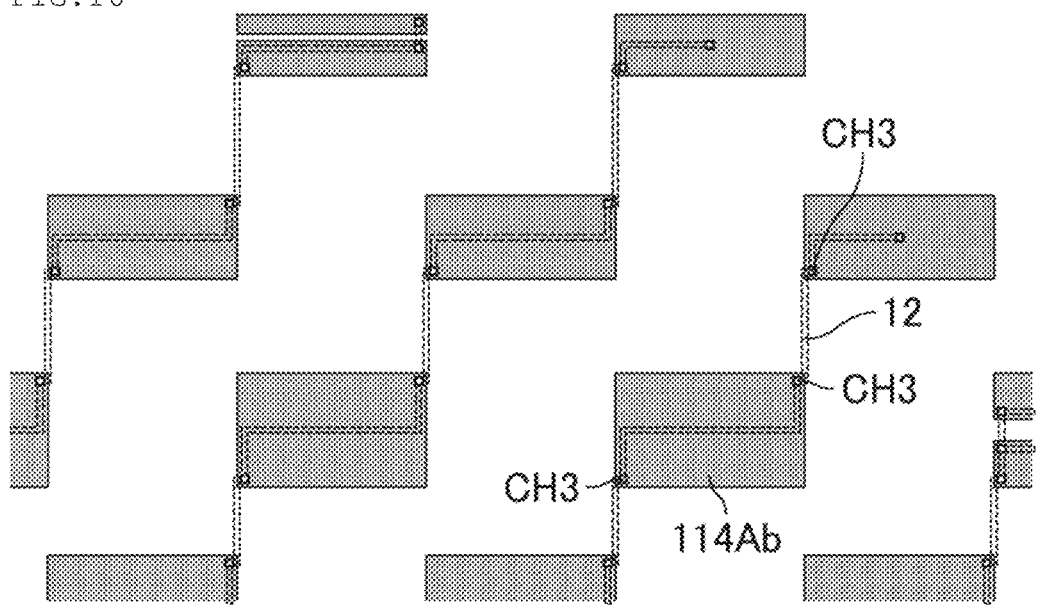
FIG. 16 is another example of a partially enlarged schematic plan view of the island electrodes in FIG. 12.

FIG. 15 is an example of a partially enlarged schematic plan view of the island electrodes in FIG. 12. FIG. 16 is another example of a partially enlarged schematic plan view of the island electrodes in FIG. 12. Both FIG. 15 and FIG. 16 are enlarged schematic plan views of some of the island electrodes surrounded by the dashed and dotted line in FIG. 12. In FIG. 15 and FIG. 16, the lower-layer electrode 12 portions below the island electrodes 114Ab are indicated by the dotted lines, and the contact holes CH3 through which the island electrodes 114Ab and the lower-layer electrode 12 are connected are indicated by white squares. The lower-layer electrode 12 may overlap the boundaries between pixels 9 defining the later-described image-providing liquid crystal panel 4. The island electrodes 114Ab may be connected to one another in the row direction and the column direction by the lower-layer electrode 12 disposed in a net-like pattern and overlapping the boundaries of the pixels as shown in FIG. 15, for example, or may be connected to one another in an oblique direction by the lower-layer electrode 12 disposed in an oblique direction and overlapping the boundaries of the pixels as shown in FIG. 16.

The lower-layer electrode 12 may be disposed along the boundary between the first dimming electrode 114A and the first dimming electrode 114B and overlap the boundary between these electrodes in a plan view. The studies made by the present inventors witnessed a case where, in providing display on a horizontal alignment mode dimming panel, an misalignment of the liquid crystal molecules occurred in the boundaries between the dimming units, which produced dark lines. The dark lines in some cases made the boundaries between the dimming units noticeable to deteriorate the display quality of the dimming panel, eventually decreasing the transmittance of the dimming panel. Disposing the lower-layer electrode 12 such that it extends along the boundary between the first dimming electrode 114A and the first dimming electrode 114B and overlaps the boundary between these electrodes can reduce or prevent occurrence of a dark line between adjacent first dimming electrodes.

Figure 17:
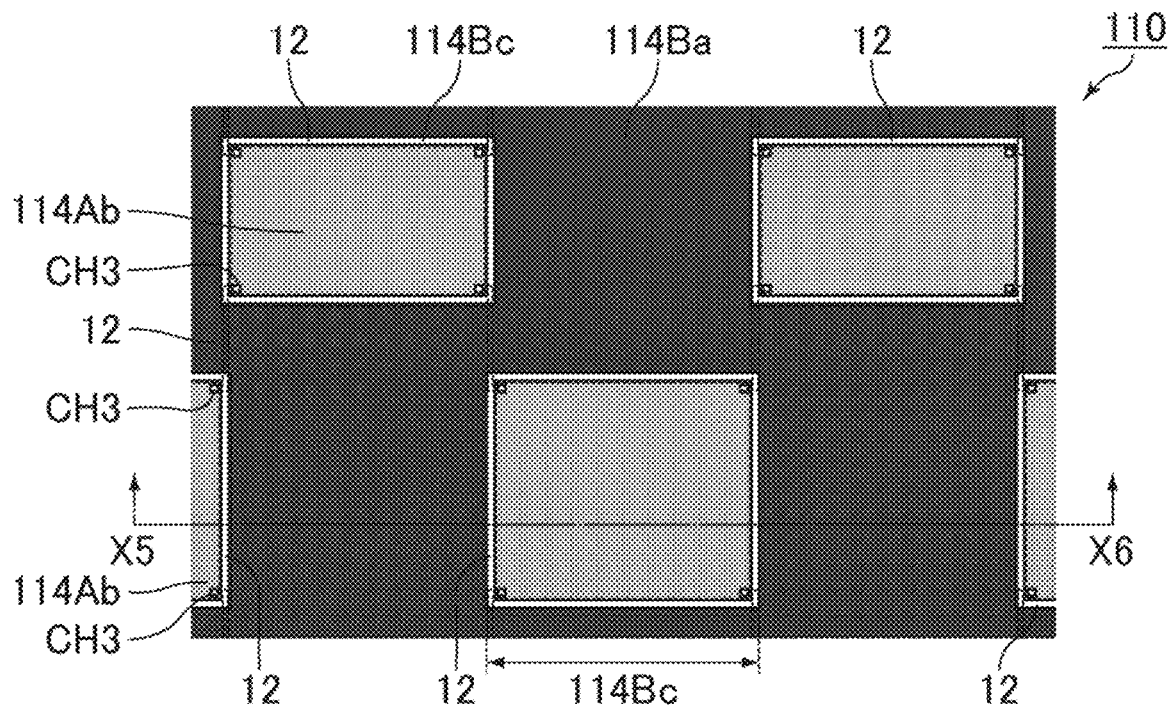
FIG. 17 is a schematic plan view of a first substrate, showing an example of arrangement of a lower-layer electrode in the dimming panel of Embodiment 3.
Figure 18:
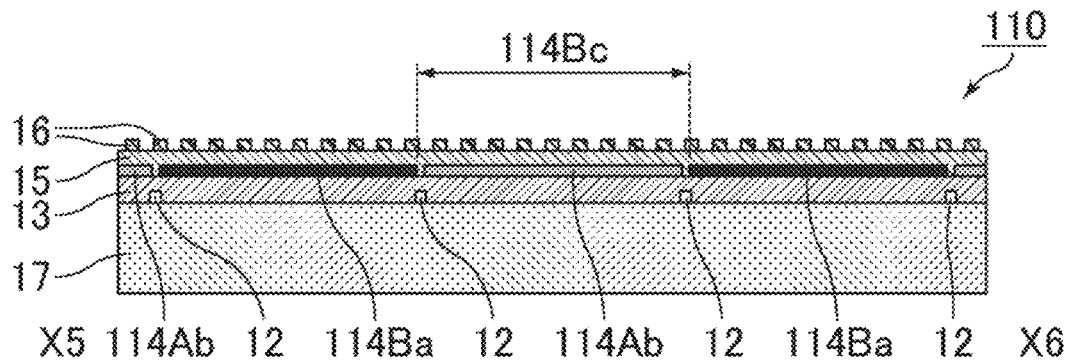
FIG. 18 is a schematic cross-sectional view taken along line X5-X6 on the first substrate in FIG. 17.

FIG. 17 is a schematic plan view of a first substrate, slowing an example of arrangement of a lower-layer electrode in the dimming panel of Embodiment 3. FIG. 18 is a schematic cross-sectional view taken along line X5-X6 on the first substrate in FIG. 17. For example, as shown in FIG. 17 and FIG. 18, the lower-layer electrode 12, in a plan view, may include portions overlapping the regions between the apertures 114Bc in the base electrode 114Ba of the first dimming electrode 114B and the respective island electrodes 114Ab of the first dimming electrode 114A. The lower-layer electrode 12 may include portions having an annular shape extending along the outer edge of each of the island electrodes 114Ab. Although not shown, the lower-layer electrode 12, in a plan view, may include portions overlapping the regions between the island electrodes 114Ab of the first dimming electrode 114A and the island electrodes 114Bb of the first dimming electrode 114B.

Figure 19:
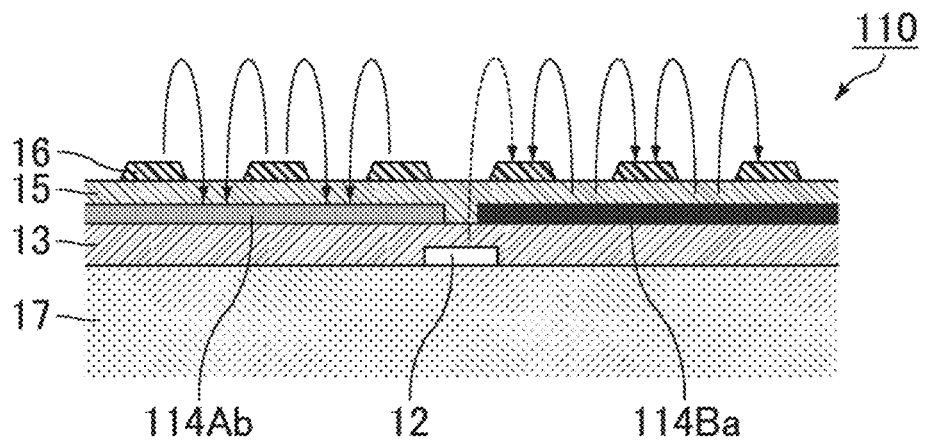
FIG. 19 is a partially enlarged schematic cross-sectional view of FIG. 18.

FIG. 19 is a partially enlarged schematic cross-sectional view of FIG. 18. The boundary between the first dimming electrode 114A and the first dimming electrode 114B is affected by both an electric field generated between the first dimming electrode 114A and the second electrode 16 and an electric field generated between the first dimming electrode 114B and the second electrode 16. Liquid crystal molecules in such a boundary are less movable, which causes an misalignment. The boundary may therefore be observed as a dark line. Thus, as shown in FIG. 19, in a plan view, the lower-layer electrode 12 overlaps the region between the first dimming electrode 114A and the first dimming electrode 114B, so that an electric field is generated between the lower-layer electrode 12 and the second electrode 16. This electric field can change the alignment of liquid crystal molecules in the boundary between the first dimming electrode 114A and the first dimming electrode 114B to reduce or prevent generation of a dark line. This can reduce or prevent deterioration in display quality due to a dark line in the boundary between the first dimming electrodes, and also can increase the luminance of the dimming panel.

Embodiment 4

Figure 20:
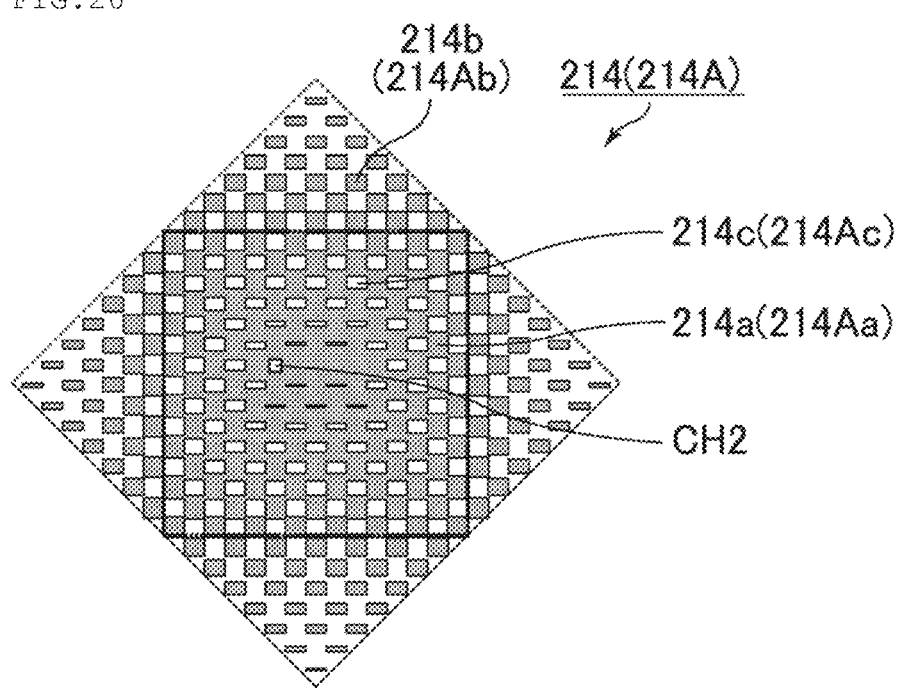
FIG. 20 is a schematic plan view of a single first dimming electrode in a dimming panel of Embodiment 4.
Figure 21:
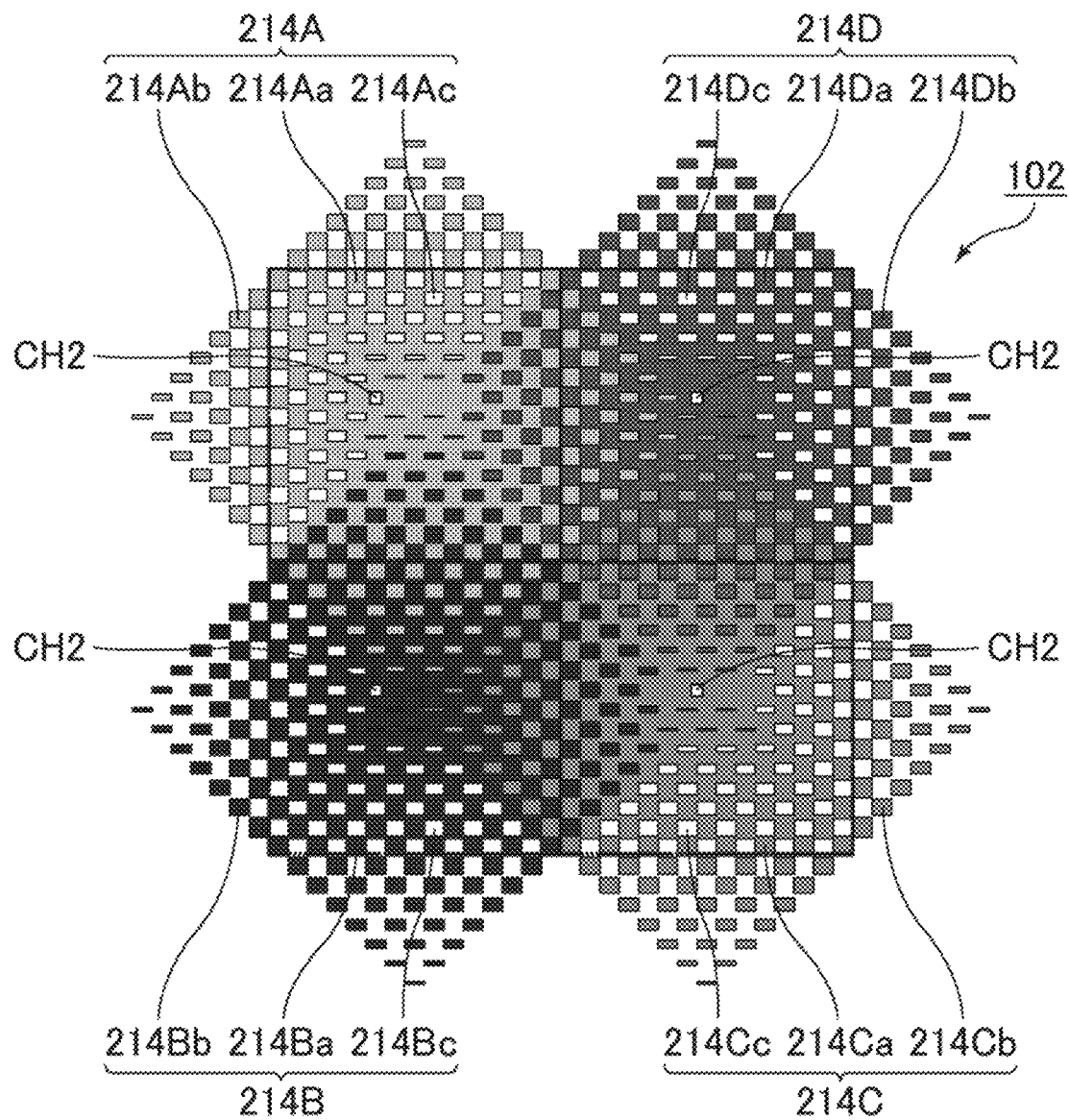
FIG. 21 is a schematic plan view of a dimming panel including four first dimming electrodes in FIG. 20.

A dimming panel 102 of Embodiment 4 is a modified example of Embodiment 3 and has the same structure as in Embodiment 3, except that the first dimming electrodes have a different structure. Thus, description of the components having the same structure as described above is omitted. FIG. 20 is a schematic plan view of a single first dimming electrode in a dimming panel of Embodiment 4. FIG. 21 is a schematic plan view of a dimming panel including four first dimming electrodes in FIG. 20. In FIG. 20 and FIG. 21, each portion surrounded by a dashed and double-dotted line shows an arrangement region for determining the position of a first dimming electrode.

As shown in FIG. 20, in Embodiment 4, the outer edge shape of the arrangement region for determining the position of a first dimming electrode is quadrilateral (square). A base electrode 214a is provided with apertures 214c (214Ac). Island electrodes 214b (214Ab) surround the base electrode 214a in a plan view. The island electrodes 214Ab are arranged in a concentric quadrilateral pattern from the center of the base electrode 214Aa toward the outer edge of the first dimming electrode 214A. The island electrodes 214b are arranged such that their electrode area decreases from the center of the base electrode 214a toward the outer edge of the first dimming electrode 214. The apertures 214c are formed such that their aperture area increases from the center of the base electrode 214a toward the outer edge of the first dimming electrode 214. Embodiment 4 shows a case where the planar shape of at least one of the island electrodes 214b is a quadrilateral, and the outer edge shape of at least one of the apertures 214c is also a quadrilateral.

Since the outer edge shape of the arrangement regions in the dimming panel of Embodiment 4 is a quadrilateral, a single first dimming electrode 214A is adjacent to four other first dimming electrodes with its four sides as the boundaries. Arrangement of two first dimming electrodes 214B and 214D among the four other first dimming electrodes adjacent to the first dimming electrode 214A is described with reference to FIG. 21. As shown in FIG. 21, the first dimming electrodes 214A, 214B, 214C, and 214D respectively include base electrodes 214Aa, 214Ba, 214Ca, and 214Da, and island electrodes 214Ab, 214Bb, 214Cb, and 214Db respectively surrounding the base electrodes 214Aa, 214Ba, 214Ca, and 214Da in a plan view. In FIG. 21, each portion surrounded by the dashed and double-dotted line indicates the base electrode. The base electrodes 214Aa, 214Ba, 214Ca, and 214Da are respectively provided with apertures 214Ac, 214Bc, 214Cc, and 214Dc.

As shown in FIG. 21, at least one of the island electrodes 214Ab of the first dimming electrode 214A is disposed inside at least one of the apertures 214Bc in the base electrode 214Ba of the first dimming electrode 214B and the apertures 214Dc in the base electrode 214Da of the first dimming electrode 214D, the base electrodes 214Ba and 214Da being respectively vertically and horizontally adjacent to the base electrode 214Aa, with the four sides of the base electrode 214Aa forming the outer edge as boundaries. Also, at least one of the island electrodes 214Bb of the first dimming electrode 214B and the island electrodes 214Db of the first dimming electrode 214D is disposed inside at least one of the apertures 214Ac in the base electrode 214Aa of the first dimming electrode 214A.

Embodiment 5

Figure 22:
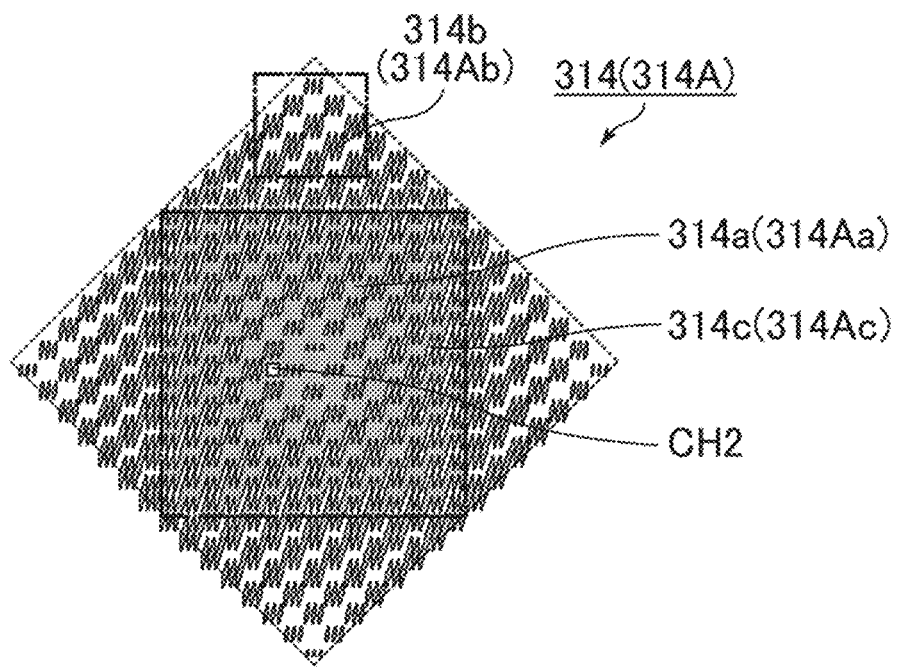
FIG. 22 is a schematic plan view of a single first dimming electrode in a dimming panel of Embodiment 5.
Figure 23:
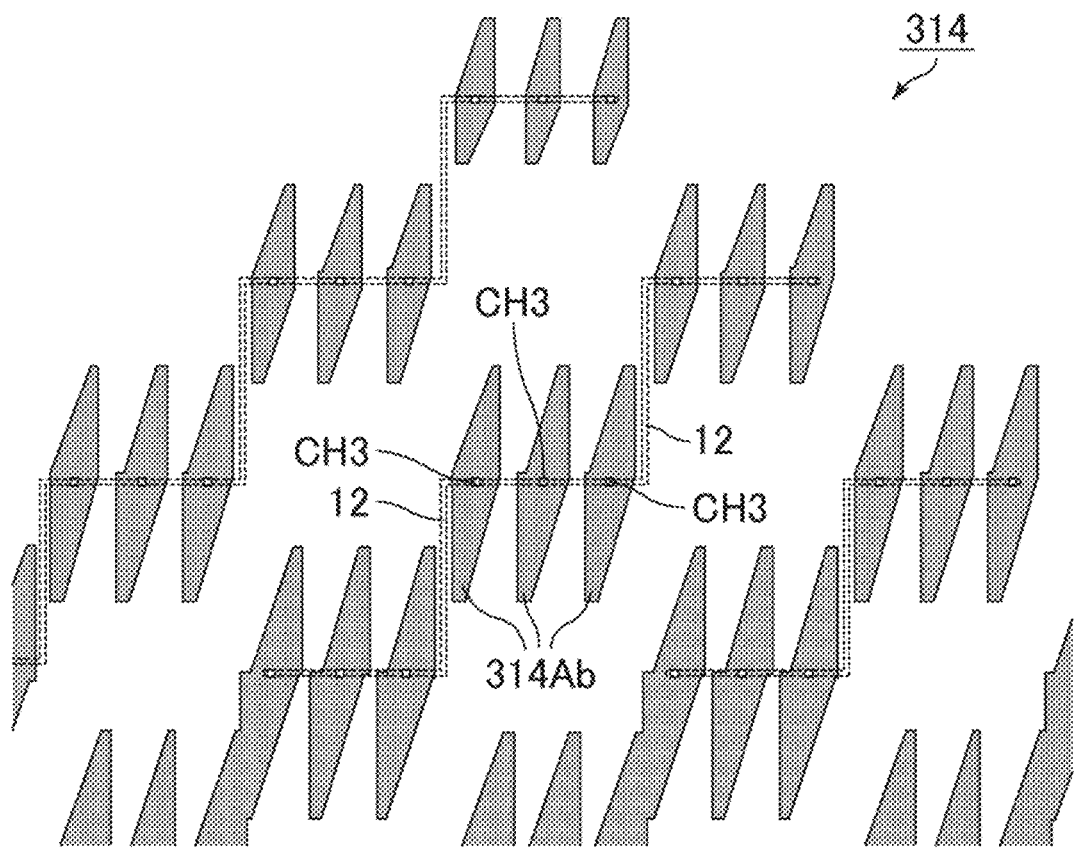
FIG. 23 is an example of a partially enlarged schematic plan view of the island electrodes in FIG. 22.
Figure 24:
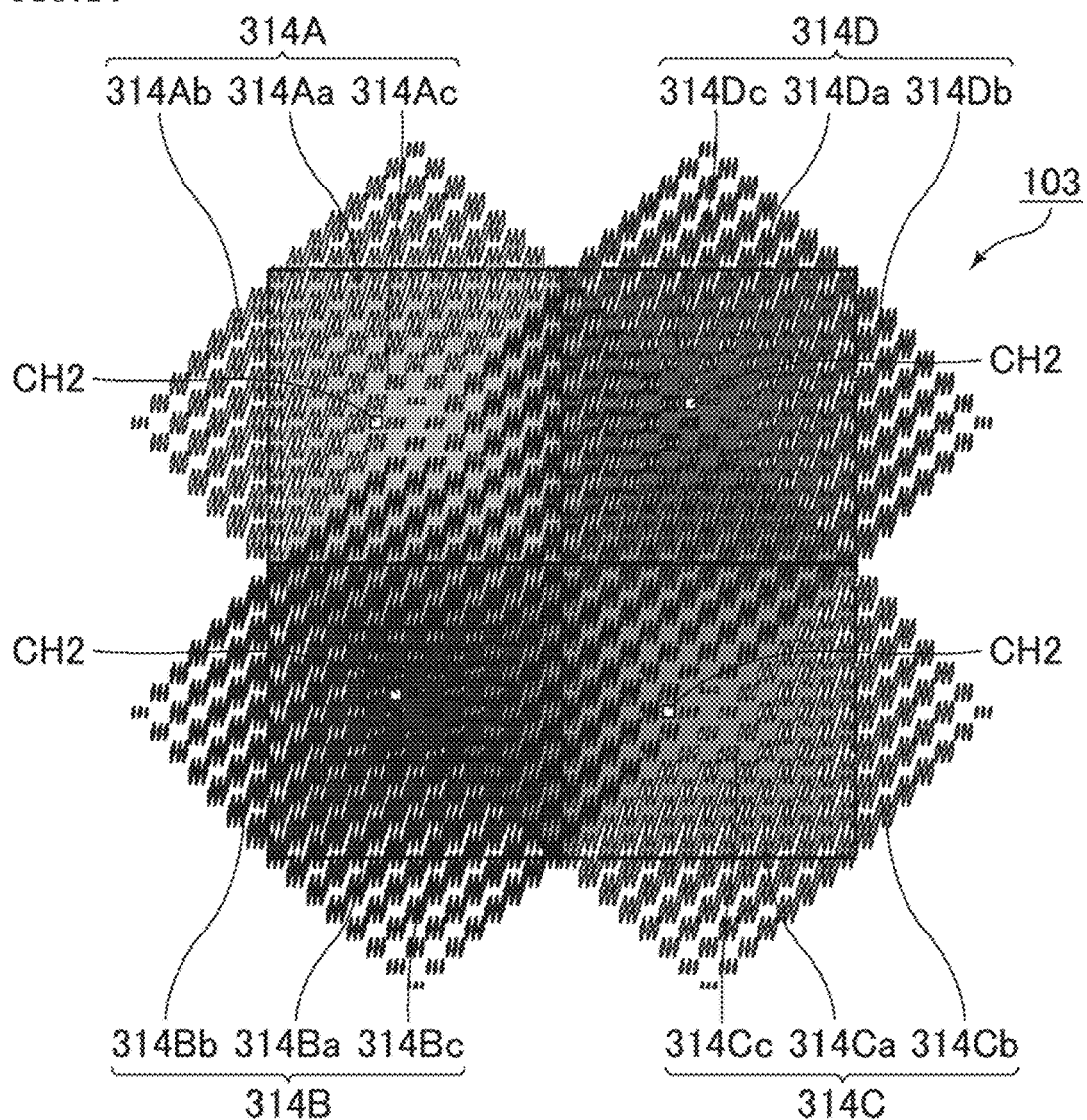
FIG. 24 is a schematic plan view of a dimming panel including four first dimming electrodes in FIG. 22.

A dimming panel 103 of Embodiment 5 is a modified example of the dimming panel of Embodiment 3 and has the same structure as in Embodiment 3, except that the first dimming electrode has a different structure. Thus, description of the components having the same structure as described above is omitted. FIG. 22 is a schematic plan view of a single first dimming electrode in a dimming panel of Embodiment 5. FIG. 23 is an example of a partially enlarged schematic plan view of the island electrodes in FIG. 22. FIG. 23 is a partially enlarged schematic view of the island electrodes surrounded by the dashed and dotted line in FIG. 22. FIG. 24 is a schematic plan view of a dimming panel including four first dimming electrodes in FIG. 22. In FIG. 22 and FIG. 24, the portion surrounded by the dashed and double-dotted line is a base electrode.

As shown in FIG. 22, in Embodiment 5, the outer edge shape of the arrangement region for determining the position or a first dimming electrode is a quadrilateral (square). A base electrode 314a is provided with apertures 314c (314Ac). Island electrodes 314b (314Ab) surround the base electrode 314a in a plan view. The island electrodes 314b are arranged such that their electrode area decreases from the center of the base electrode 314a toward the outer edge of the first dimming electrode 314. The apertures 314c are formed such that their aperture area increases from the center of the base electrode 314a toward the outer edge of the first dimming electrode 314.

In FIG. 23, the lower-layer electrode 12 portions below the island electrodes 314Ab is indicated by the dotted lines, and the contact holes CH3 through which the island electrodes 314Ab and the lower-layer electrode 12 are connected are indicated by white squares. For example, as shown in FIG. 23, three island electrodes 314Ab arranged in the row direction may be connected to one another by the lower-layer electrode 12, and also to another island electrode 314Ab at a position in an oblique direction by the lower-layer electrode 12.

Since the outer edge shape of the arrangement regions in the dimming panel of Embodiment 5 is a quadrilateral, a single first dimming electrode 314A adjacent to four other first dimming electrodes with its four sides as the boundaries. As shown in FIG. 24, at least one of the island electrodes 314b of the first dimming electrode 314A is disposed inside at least one of the apertures 314Bc in the base electrode 314Ba of the first dimming electrode 314B and the apertures 314Dc in the base electrode 314Da of the first dimming electrode 314D, the base electrodes 314Ba and 314Da being respectively vertically and horizontally adjacent to the base electrode 314Aa, with the four sides of the base electrode 314Aa forming the outer edge as boundaries. Also, at least one of the island electrodes 314Bb of the first dimming electrode 314B and the island electrodes 314Db of the first dimming electrode 314D is disposed inside at least one of the apertures 314Ac in the base electrode 314Aa of the first dimming electrode 314A.

Figure 25:
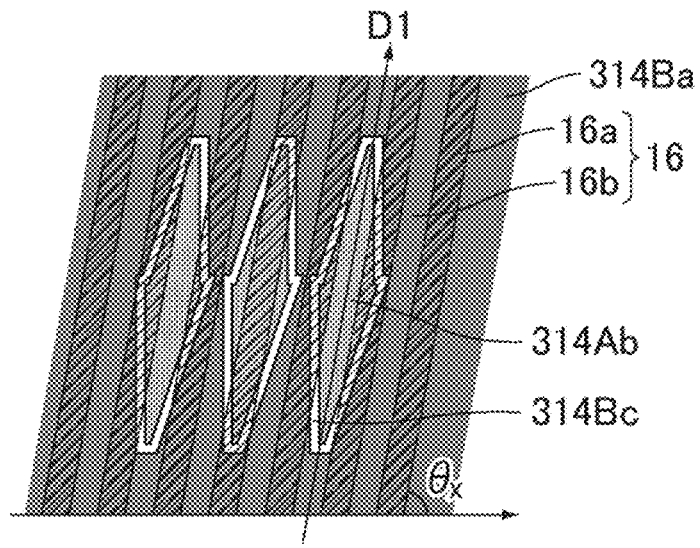
FIG. 25 is an enlarged schematic plan view of a boundary of the adjacent first dimming electrodes in FIG. 24.

FIG. 25 is an enlarged schematic plan view of a boundary of the adjacent first dimming electrodes in FIG. 24. FIG. 25 is an enlarged view of the portion in which the island electrodes 314Ab of the first dimming electrode 314A are disposed inside the respective apertures 314Bc in the base electrode 314Ba of the first dimming electrode 314B. When the island electrodes 314Ab are disposed between the island electrodes 314Db of the adjacent first dimming electrode 314B or inside the respective apertures 314Bc of the adjacent first dimming electrode 314B, the adjacent first dimming electrodes are opposite to each other with a space (gap) in between. As described in Embodiment 1, the first dimming electrodes form fringe electric fields with the linear electrodes of the second electrode stacked together via the first insulator layer. In a plan view, in the portion where the gap between the adjacent first dimming electrodes and the linear electrode cross each other, the liquid crystal molecules are less movable, which tends to cause an misalignment.

A case is described where in observation from the second substrate 40 side, an angle measured in the clockwise direction is defined negative and an angle measured in the counterclockwise direction is defined positive. Based on these definitions, at least one of the island electrodes 314b preferably has an outer edge shape including a linear portion that forms an angle of −30° to +30° with the extension direction D1 of the linear electrodes 16a of the second electrode 16 described above. Setting the angle (hereinafter, also referred to as the angle θy) formed by the linear portion with the extension direction of the linear electrodes 16a to −30° to +30° increases the distance between adjacent misalignment regions (where the gap and the linear electrodes cross each other), making these regions less likely to be observed as dark lines. If the angle θy is smaller than −30° or greater than +30°, the distance between adjacent misalignment regions decreases, which may make the regions more likely to be observed as dark lines. The angle θy is more preferably −15° to +15°.

Figure 26:
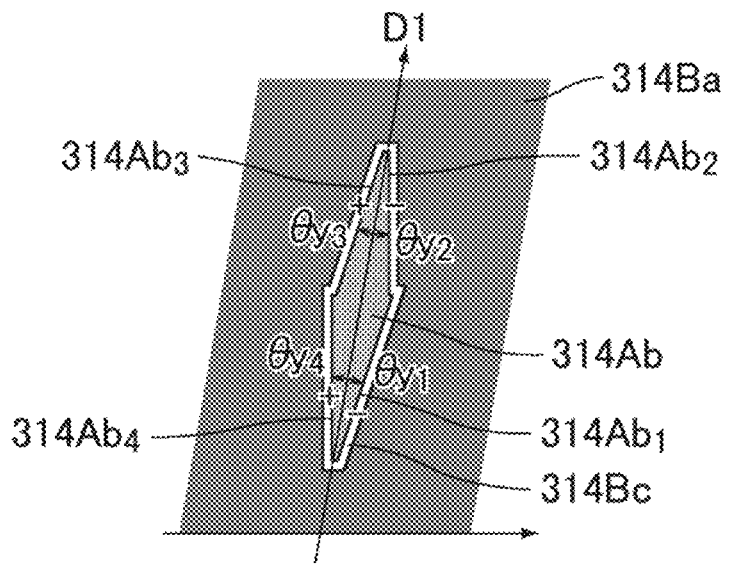
FIG. 26 is an enlarged schematic view showing one of the island electrodes in FIG. 25.

FIG. 26 is an enlarged schematic view showing one of the island electrodes in FIG. 25. As shown in FIG. 26, the outer edge of at least one of the island electrodes 314Ab includes four linear portions $314Ab_1$, $314Ab_2$, $314Ab_3$ and $314Ab_4$, for example. Here, in observation from the second substrate 40 side, an angle measured in the counterclockwise direction relative to D1 is defined positive and an angle measured in the clockwise direction relative to D1 is defined negative. When the angles formed by D1 and the linear portions $314Ab_1$, $314Ab_2$, $314Ab_3$, and $314Ab_4$ are defined as $\theta_{y1}$, $\theta_{y2}$, $\theta_{y3}$, and $\theta_{y4}$, then at least one of $\theta_{y1}$, $\theta_{y2}$, $\theta_{y3}$, and $\theta_{y4}$ is preferably −30° to +30°, more preferably −15° to +15°. All of $\theta_{y1}$, $\theta_{y2}$, $\theta_{y3}$, and $\theta_{y4}$ may be −30° to +30° or mar be −15° to +15°.

A case is now described where in observation from the second substrate 40 side, an angle measured in the clockwise direction is defined negative and an angle measured in the counterclockwise direction is defined positive. Based on these definitions, at least one of the apertures 314c preferably has an outer edge shape including a linear portion that forms an angle of −30° to +30° with the extension direction D1 of the linear electrodes 16a of the second electrode 16 described above. When the island electrodes 314Ab are disposed inside the respective apertures 314Bc in the base electrode 314Ba of the adjacent first dimming electrode 314B, setting the angle (hereinafter, also referred to as the angle θz) formed by the linear portion with the extension direction of the linear electrodes 16a to −30° to +30° increases the distance between adjacent misalignment regions, making these regions less likely to be observed as dark lines. If the angle θz is smaller than −30° or greater than +30°, the distance between adjacent misalignment regions decreases, which may make the regions more likely to be observed as dark lines. The angle θz is more preferably −15° to +15°.

Figure 27:
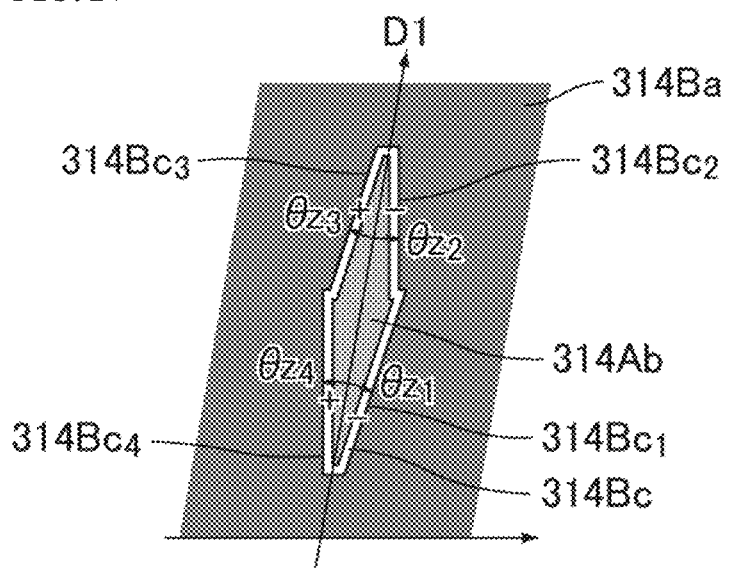
FIG. 27 is an enlarged schematic view showing one of the apertures in FIG. 25.

FIG. 27 is an enlarged schematic view showing one of the apertures in FIG. 25. For a smaller gap between adjacent first dimming electrodes, when the planar shape of at least one of the island electrodes is a quadrilateral, the outer edge shape of at least one of the apertures inside is also preferably a quadrilateral. With island electrodes having the same shape as the apertures being disposed inside the respective apertures, loss of aperture ratio can be reduced. As shown in FIG. 27, as to the first dimming electrode 314B adjacent to the first dimming electrode 314A, as with the island electrodes described above, the outer edge of at least one of the apertures 314Bc in the base electrode 314Ba includes, for example, four linear portions $314Bc_1$, $314Bc_2$, $314Bc_3$, and $314Bc_4$. When the angles formed by D1 and the linear portions $314Bc_1$, $314Bc_2$, $314Bc_3$, and $314Bc_4$ are respectively defined as $\theta_{z11}$, $\theta_{z2}$, $\theta_{z3}$, and $\theta_{z4}$, then at least one of $\theta_{z1}$, $\theta_{z2}$, $\theta_{z3}$, and $\theta_{z4}$ is preferably −30° to +30°, more preferably −15° to +15°. All of $\theta_{z1}$, $\theta_{z2}$, $\theta_{z3}$, and $\theta_{z4}$ may be −30° to +30° or may be −15° to +15°.

In the dimming panels of Embodiments 3 to 5, the boundaries between adjacent dimming units are less noticeable owing to the smooth changes in luminance distribution as well as reduction or prevention of dark lines in the boundaries between the dimming units. Thus, the dimming panels are also suitable as anti-glare panels which adjust the amount of light passing therethrough. The anti-glare panels can be used as sun visors for vehicles such as automobiles and train cars, for example. Also, since having excellent viewing angle characteristics and a high transmittance, each of the dimming panels can be disposed between an image-providing liquid crystal panel and a backlight and function suitably as a component of a liquid crystal display device.

Embodiment 6

A dimming panel 201 of Embodiment 6 further includes a drive circuit and dimming units arranged in an in-plane direction. The second electrode includes second dimming electrodes arranged in the respective dimming units. The drive circuit is configured to apply a constant voltage to the first electrode and control voltages to be applied to the respective second dimming electrodes.

Figure 28:
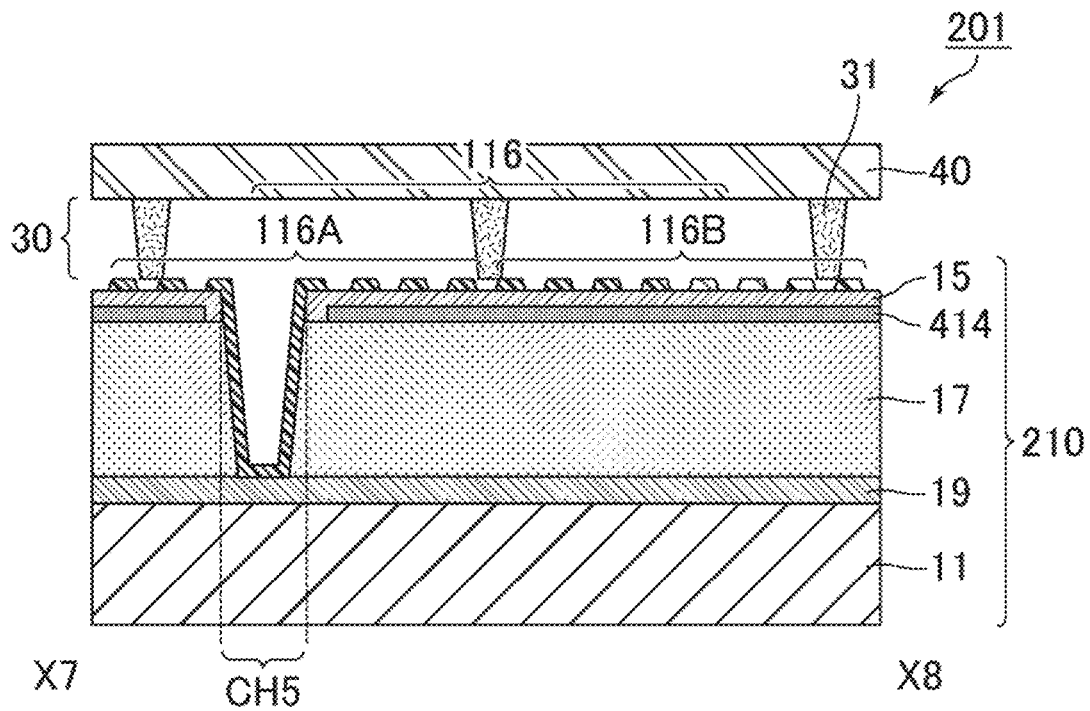
FIG. 28 is a schematic cross-sectional view of a dimming panel of Embodiment 6.
Figure 29:
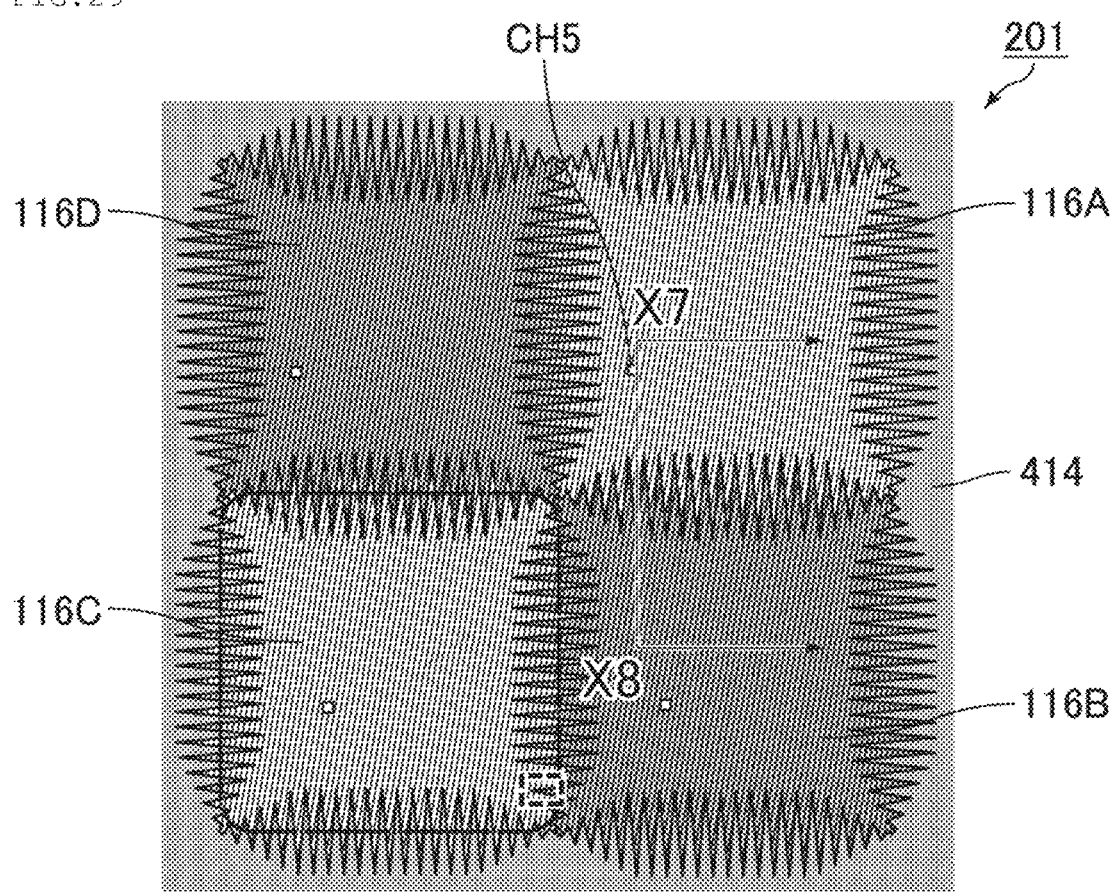
FIG. 29 is a partially enlarged schematic plan view of second electrodes in the dimming panel of Embodiment 6.

FIG. 28 is a schematic cross-sectional view of a dimming panel of Embodiment 6. FIG. 29 is a partially enlarged schematic plan view of second electrodes in the dimming panel of Embodiment 6. FIG. 28 is a schematic cross-sectional view taken along line X7-X8 in FIG. 29. As shown in FIG. 28, the dimming panel 201 of Embodiment 6 sequentially includes a first substrate 210, the liquid crystal layer 30, and the second substrate 40. The first substrate 210 sequentially includes the insulating substrate 11, a first electrode 414, the first insulator layer 15, and a second electrode 116 (116A and 116B). The second electrode 116 (116A) may be electrically connected to the connection line 19 through a contact hole CH5 penetrating the first insulator layer 15 and the third insulator layer 17. The dimming panel of Embodiment 6 is the same as that of Embodiment 1, except that the first electrode 414 and the second electrode 116 have different structures. Thus, description of the components having the same structure as described above is omitted.

As shown in FIG. 28 and FIG. 29, the first electrode 414 may be a planar electrode formed on the entire dimming panel except for the contact holes CH5. The first electrode 414 may be formed from, for example, a transparent conductive material such as ITO or IZO.

Figure 30:
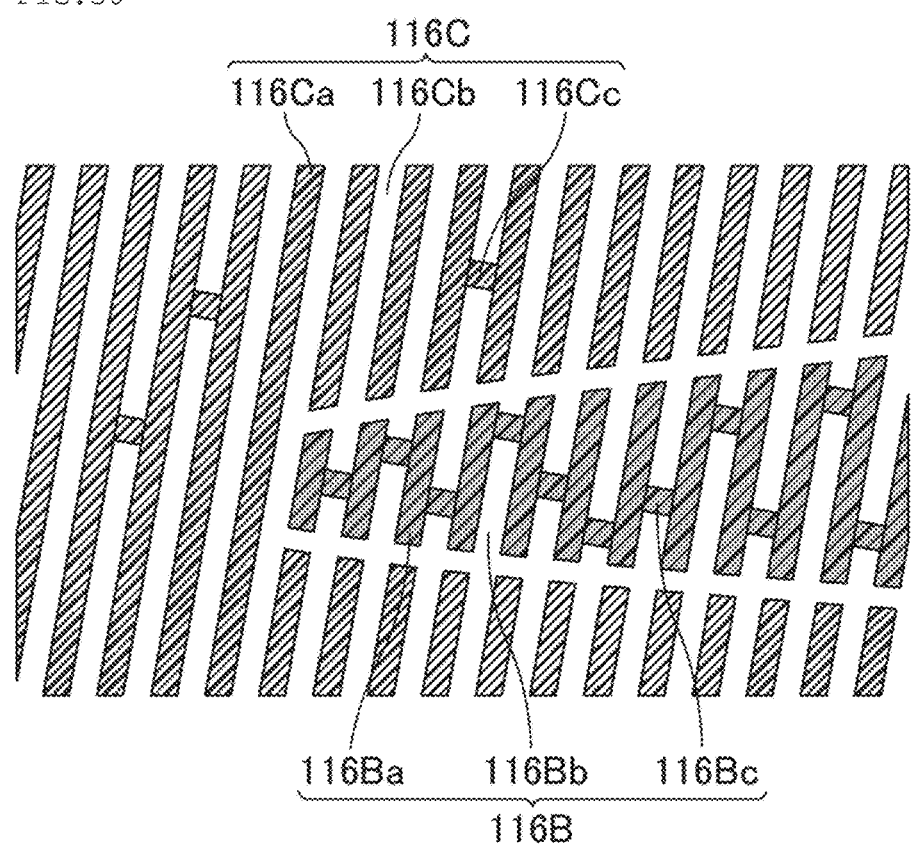
FIG. 30 is an enlarged schematic plan view of the boundary between two adjacent second electrodes in FIG. 29.

As shown in FIG. 28 and FIG. 29, the second electrode 116 includes second dimming electrodes arranged in the respective dimming units. FIG. 29 shows a case where the second electrodes 116 include second dimming electrodes 116A, 116B, 116C, an 116D. FIG. 30 is an enlarged schematic plan view of the boundary between two adjacent second electrodes in FIG. 29. FIG. 30 is an enlarged view of the portion surrounded by the dotted line in FIG. 29. The focus is now placed on adjacent second dimming electrodes. As shown in FIG. 30, the second dimming electrodes 116B and 116C respectively include, in a plan view, linear electrodes 116Ba and 116Ca parallel to each other. The regions formed between the linear electrodes 116Ba and those formed between the linear electrodes 116Ca are respectively the slit regions 116Bb and 116Cb. The second dimming electrode 116B includes bridge electrodes 116Bc arranged in the slit regions 116Bb and connecting two adjacent linear electrodes 116Ba. The second dimming electrode 116C includes bridge electrodes 116C arranged in the slit regions 116Cb and connecting two adjacent linear electrodes 116Ca. As described in Embodiment 1, the bridge electrodes 116Bc and 116Cc are discrete from one another.

As shown in FIG. 29 and FIG. 30, the linear electrodes 116Ba and 116Ca extend toward the other dimming electrode such that the boundaries between adjacent second dimming electrodes 116B and 116C are irregular (zigzag) in a plan view. This can lead to a smooth luminance distribution between the dimming units.

When a predetermined constant voltage as a reference is applied to the first electrode 414, the drive circuit may control the constant voltage to be applied to the first electrode 414. Application of a constant voltage to the first electrode 414 may be achieved by applying a predetermined voltage as a reference or grounding the first electrode 414. The drive circuit controls the voltages to be applied to the second dimming electrodes. The fringe electric fields generated between the first electrode 414 and the second dimming electrodes change the alignment azimuth of the liquid crystal molecules in the liquid crystal layer 30, so that the amount of light passing through each of the dimming units in the dimming panel can be controlled.

Embodiment 7

Figure 31:
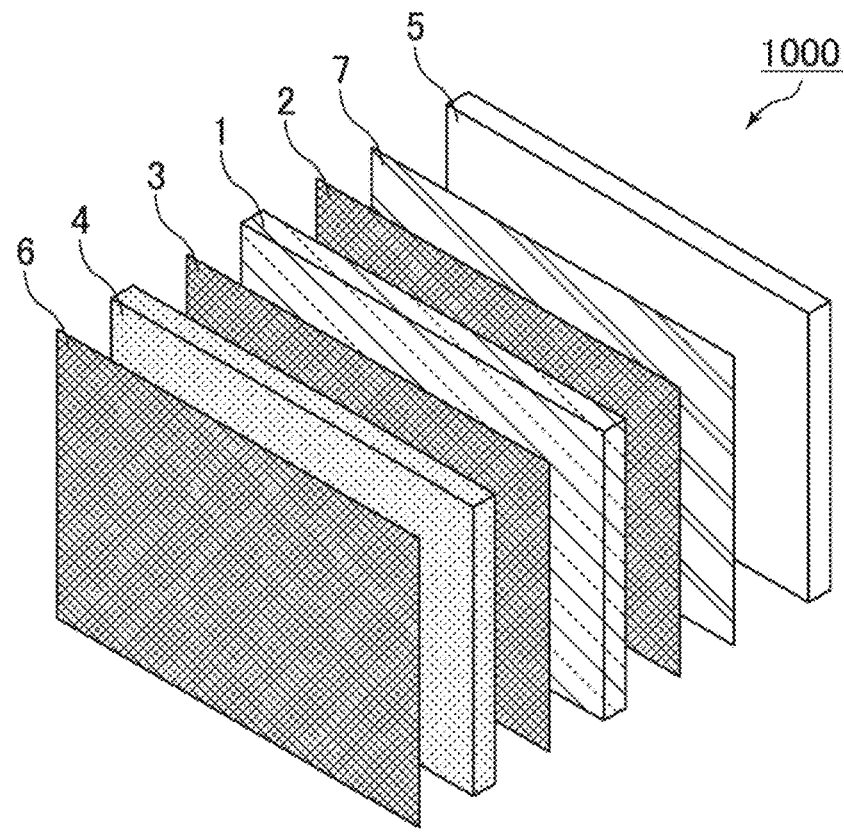
FIG. 31 is an exploded perspective view of a liquid crystal display device of Embodiment 7.

A liquid crystal display device of Embodiment 7 sequentially includes an image-providing liquid crystal panel, the dimming panel of an embodiment of the present invention, and a backlight. FIG. 31 is an exploded perspective view of a liquid crystal display device of Embodiment 7. As shown in FIG. 31, a liquid crystal display device 1000 of Embodiment 5 includes the image-providing liquid crystal panel 4, a backlight 5, and the dimming panel 1 between the image-providing liquid crystal panel 4 and the backlight 5.

A study on methods for displaying a high quality image has been made aiming to develop a liquid crystal display device capable of providing high dynamic range (HDR) images. The HDR technique enables display of an image more clearly with a wider brightness range than the conventional dynamic range (standard dynamic range, SDR) technique. In order to display an image with a wider brightness range by the HDR technique, the liquid crystal display device is required to have an increased maximum luminance and an increased contrast ratio. A method for increasing the contrast ratio of a liquid crystal display device includes dividing the light emitting surface of a backlight into multiple illuminating areas and separately driving these areas (local dimming). Unfortunately, the illuminating areas for local dimming have a significantly greater size than the pixels of the image-providing liquid crystal panel. This may result in a halo phenomenon that causes a portion which should be displayed dark to appear brightly at a boundary between images with a large difference in brightness. The study demonstrated that provision of a dimming panel between the image-providing liquid crystal panel and the backlight can control the amount of light emitted from the backlight and transmitted through each dimming unit constituting the dimming panel, which can reduce the halo phenomenon while increasing the contrast ratio of the liquid crystal display device.

A pair of polarizing plates may be disposed on the surfaces of the image-providing liquid crystal panel 4. For example, as shown in FIG. 31, from the viewer side, a third polarizing plate 6, the image-providing liquid crystal panel 4, the second polarizing plate 3, the dimming panel 1, and the first polarizing plate 2 may be arranged sequentially. The image-providing liquid crystal panel 4 and the dimming panel 1 may share the second polarizing plate 3 between the panels. The third polarizing plate 6 is, for example, a linear polarizing plate. Preferably, the third polarizing plate 6 and the second polarizing plate 3 are arranged with their absorption axes being perpendicular to each other, while the second polarizing plate 3 and the first polarizing plate 2 are arranged with their absorption axes being perpendicular to each other. An optical sheet 7 such as a diffusion sheet which diffuses light emitted from the backlight 5 may be disposed between the first polarizing plate 2 and the backlight 5.

Examples of the image-providing liquid crystal panel 4 include a liquid crystal panel sequentially including an active matrix substrate, a liquid crystal layer, and a color filter substrate. As having excellent viewing angle characteristics, the image-providing liquid crystal panel 4 may be a liquid crystal panel in a horizontal alignment mode such as the fringe field switching (FFS) mode or the in plane switching (IPS) mode.

The active matrix substrate includes, for example, on an insulating substrate, parallel gate lines and parallel source lines extending in a direction crossing the gate lines with an insulating film in between, and, as switching elements, thin film transistors (TFTs) at the intersections of the gate lines and the source lines. A region surrounded by two adjacent gate lines and two adjacent source lines is herein referred to as a sub-pixel. The active matrix substrate includes multiple sub-pixel electrodes provided for the respective sub-pixels and each connected to the corresponding TFT via the corresponding drain electrode. In a horizontally aligned liquid crystal panel, the active matrix substrate further includes a common electrode stacked above the sub-pixel electrodes with an insulator layer in between.

The liquid crystal layer contains liquid crystal molecules. The liquid crystal molecules may have a positive anisotropy of dielectric constant ($\Delta\epsilon$) (positive type) or a negative anisotropy of dielectric constant (negative type) defined by the following formula.

$$\Delta\epsilon = \text{(dielectric constant in long axis direction of liquid crystal molecules)} - \text{(dielectric constant in short axis direction of liquid crystal molecules)} \quad (L)$$

The color filter substrate includes, for example, on an insulating substrate, color filters of multiple colors and a black matrix partitioning the color filters of the respective colors in a plan view. The color filters of multiple colors may include red color filters, green color filters, and blue color filters. The color filters of multiple colors overlap the sub-pixels in a plan view.

The image-providing liquid crystal panel 4 preferably includes multiple pixels that are each provided with sub-pixels of multiple colors and are arranged in a matrix in a plane. The sub-pixels of multiple colors mean sub-pixels overlapping the color filters of multiple colors. In color filters of multiple colors including red color filters, green color filters, and blue color filters, for example, a sub-pixel overlapping a red color filter is also referred to as a red sub-pixel, a sub-pixel overlapping a green color filter is also referred to as a green sub-pixel, and a sub-pixel overlapping a blue color filter is also referred to as a blue sub-pixel. A red sub-pixel, a green sub-pixel, and a blue sub-pixel may form a single pixel. The dimming units of the dimming panel may each be larger than a pixel of the image-providing liquid crystal panel, and a single dimming unit may be used for dimming of multiple pixels.

Figure 32:
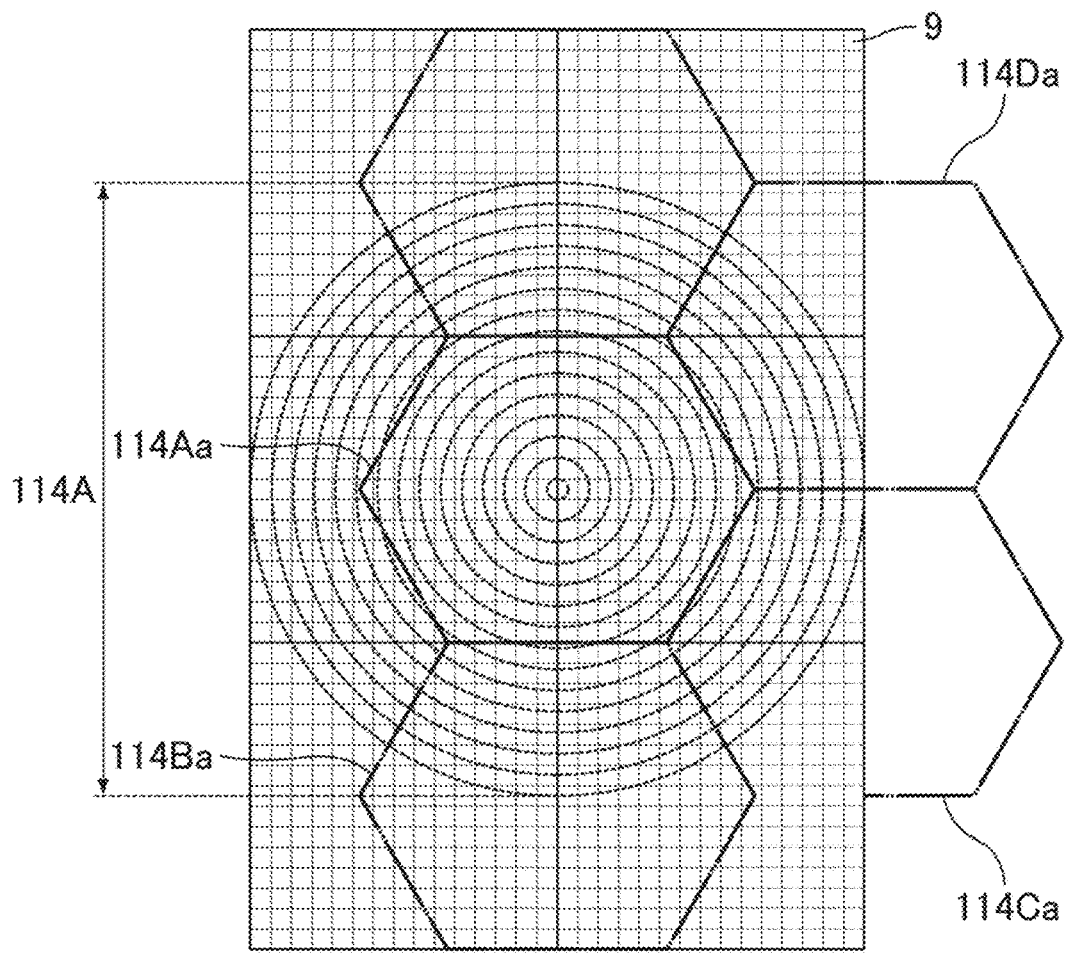
FIG. 32 is a schematic plan view of an example of an arrangement pattern of first dimming electrodes relative to pixels of an image-providing liquid crystal panel in the liquid crystal display device of Embodiment 7.

Hereinafter, the arrangement method for the first dimming electrodes is described with reference to FIG. 32 to FIG. 37 where the first electrode of the dimming panel 1 is the first dimming electrode 114A in FIG. 12. FIG. 32 is a schematic plan view of an example of an arrangement pattern of first dimming electrodes relative to pixels of an image-providing liquid crystal panel in the liquid crystal display device of Embodiment 7. In FIG. 32, each portion surrounded by a dashed and double-dotted line shows an arrangement region for determining the approximate position of a base electrode 114a.

As shown in FIG. 32, the base electrode 114a and the island electrodes 114b in the dimming pane 1 may be arranged relative to the pixels 9 of the image-providing liquid crystal panel 4. For example, arrangement regions may be laid out in the plane of the dimming panel 1, and arrangement of the base electrodes 114a may be determined relative to the positions of the arrangement regions. As shown in FIG. 32, the outer edge shape of the arrangement regions is a hexagon. Based on the hexagonal arrangement regions laid out in the plane, the positions of the base electrodes 114Aa, 114Ba, 114Ca, and 114Da in FIG. 13 can be determined. The island electrodes 114b may be arranged in a concentric circle pattern from the center of the first dimming electrode 114.

Figure 33:
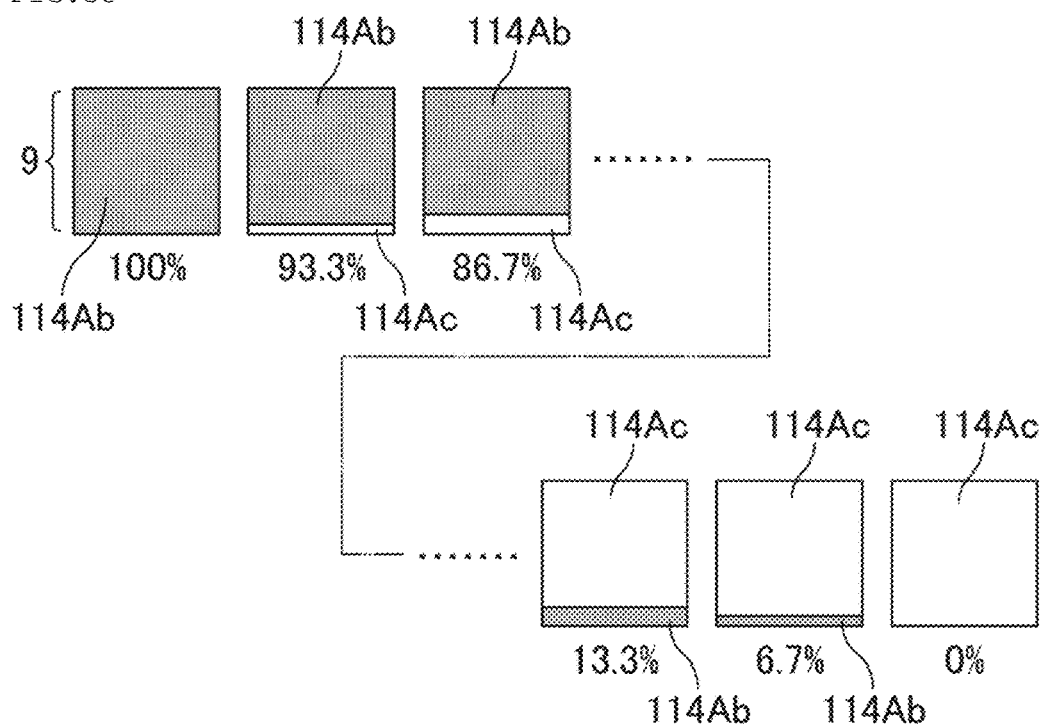
FIG. 33 is a schematic view showing a method of reducing the electrode area of the island electrodes of the first dimming electrode in FIG. 12.

Hereinafter, arrangement of the island electrodes is described with reference to FIG. 33 to FIG. 35. FIG. 33 is a schematic view showing a method of reducing the electrode area of the island electrodes of the first dimming electrode in FIG. 12. As shown in FIG. 33, the area of the island electrode 114Ab covering the pixels 9 of the image-providing liquid crystal panel 4 is set to 16 levels, for example. The electrode area is 100% when the entire surface of a single pixel 9 is covered with an island electrode. The area of the electrode covering a pixel 9 (the covering electrode) gradually decreases to 93.3%, 86.7%, and so forth from the center of the first dimming electrode 114A toward the outer edge of the first dimming electrode 114A.

The covering electrodes are preferably arranged to prevent color shifts when the dimming panel 1 and the image-providing liquid crystal panel 4 are overlaid with each other. The island electrodes 114Ab may include covering electrodes each of which covers the sub-pixels of all the colors in a single pixel 9. The covering electrodes each correspond to an electrode portion covering a single pixel 9 in a plan view.

Figure 34:
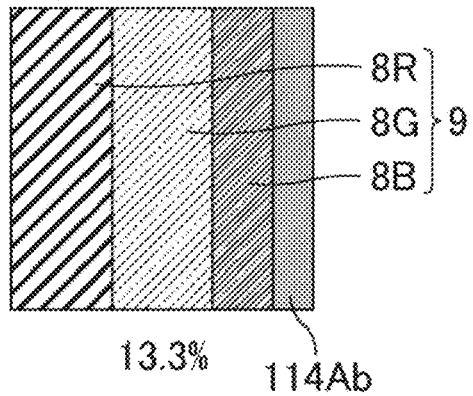
FIG. 34 is a schematic plan view of an arrangement example of a covering electrode relative to one pixel in the first dimming electrode in FIG. 12.

FIG. 34 is a schematic plan view of an arrangement example of a covering electrode relative to one pixel in the first dimming electrode in FIG. 12. FIG. 35 is a schematic plan view of a preferred arrangement example of a covering electrode relative to one pixel in the first dimming electrode in FIG. 12. FIG. 34 and FIG. 35 show cases where the electrode area of the island electrode 114Ab (covering electrode) is 13.3%. As shown in FIG. 34, with the island electrode 114Ab (covering electrode) covering only the blue sub-pixel 8B among the red sub-pixel 8R, the green sub-pixel 8G, and the blue sub-pixel 8B in a pixel 9, for example, the amount of light passing through the blue sub-pixel 8B is less than the amounts of light passing through the red sub-pixel 8R and light passing through the green sub-pixel 8G, which may cause a color shift where the desired color cannot be displayed. Thus, as shown in FIG. 35, the covering electrode preferably covers all of the red sub-pixel 8R, the green sub-pixel 8G, and the blue sub-pixel 8B in a pixel 9, more preferably in a manner that the difference between the maximum and minimum electrode areas among the electrode areas of the covering electrode covering the sub-pixels of the respective colors is 30% or less of the maximum area.

The direction in which the red sub-pixel 8R, the green sub-pixel 8G, and the blue sub-pixel 8B are arranged is defined as D2. Then, controlling the electrode width in a direction D3 perpendicular to D2 enables adjustment of the electrode area covering each of the red sub-pixel 8R, the green sub-pixel 8G, and the blue sub-pixel 8B. The covering electrode may be disposed such that the difference between the maximum and minimum electrode areas among the electrode areas of the covering electrode covering the sub-pixels of the respective colors is 30% or less of the maximum electrode area. The covering electrode is disposed such that, for example, the difference between the maximum electrode area and the minimum electrode area among its electrode area covering the red sub-pixel, its electrode area covering the green sub-pixel, and its electrode area covering the blue sub-pixel is 30% or less of the maximum electrode area. This arrangement can reduce or prevent a color shift where a color different from the desired color is observed due to an imbalance between light rays passing through the sub-pixels in a single pixel 9. The difference between the maximum electrode area and the minimum electrode area among the electrode areas of the covering electrode covering the sub-pixels of multiple colors is more preferably 10% or less, still more preferably 5% or less, of the maximum electrode area.

When the island electrodes 114Ab are arranged such that their electrode area decreases toward the outer edge of the first dimming electrode 114A and the sub-pixels of multiple colors are arranged in the first direction, the electrode width of each of the island electrodes 114Ab in the second direction perpendicular to the first direction is adjusted to reduce the electrode area of the island electrodes 114Ab toward the outer edge of the first dimming electrodes 114A while controlling the difference between the maximum electrode area and the minimum electrode areas of each island electrode covering the sub-pixels of multiple colors to 30% or less of the maximum electrode area.

Figure 35:
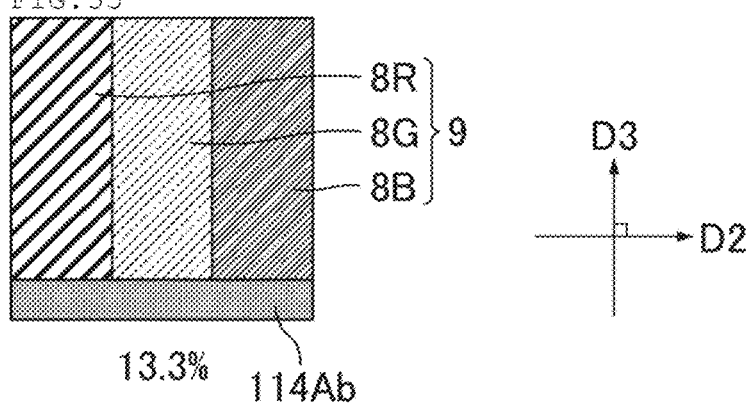
FIG. 35 is a schematic plan view of a preferred arrangement example of a covering electrode relative to one pixel in the first dimming electrode in FIG. 12.

Although FIG. 35 shows a case where a single island electrode 114Ab is disposed for a single pixel, the covering electrode only need to cover the sub-pixels of all the colors in a plan view, and a single island electrode may be disposed for two or more adjacent pixels. Also, multiple island electrodes may be disposed for a single pixel or two or more adjacent pixels. In addition, at least part of a single island electrode may be disposed to cover the sub-pixels of all the colors, or multiple island electrodes may be disposed for the respective sub-pixels of multiple colors.

Figure 36:
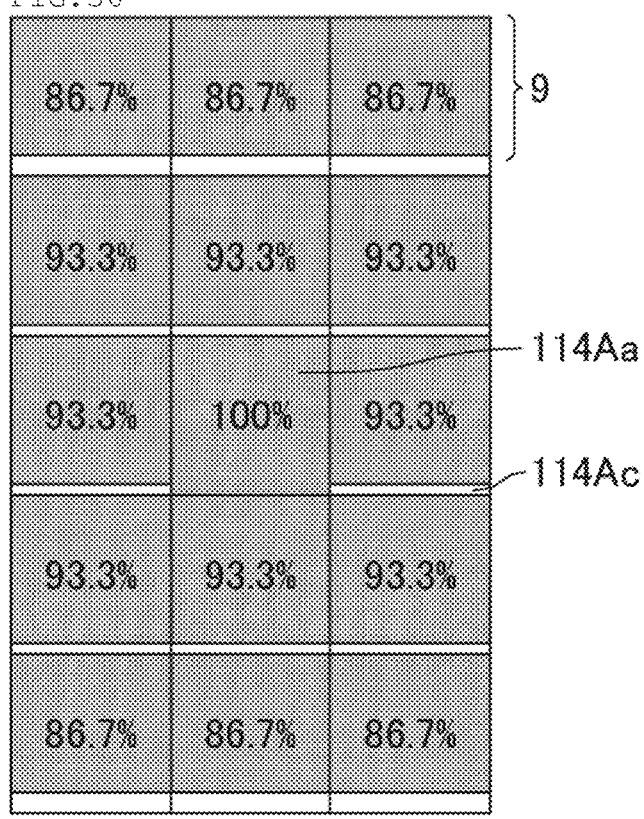
FIG. 36 is a schematic plan view of an arrangement example of an overlapping aperture relative to one pixel in the first dimming electrode in FIG. 12.
Figure 37:
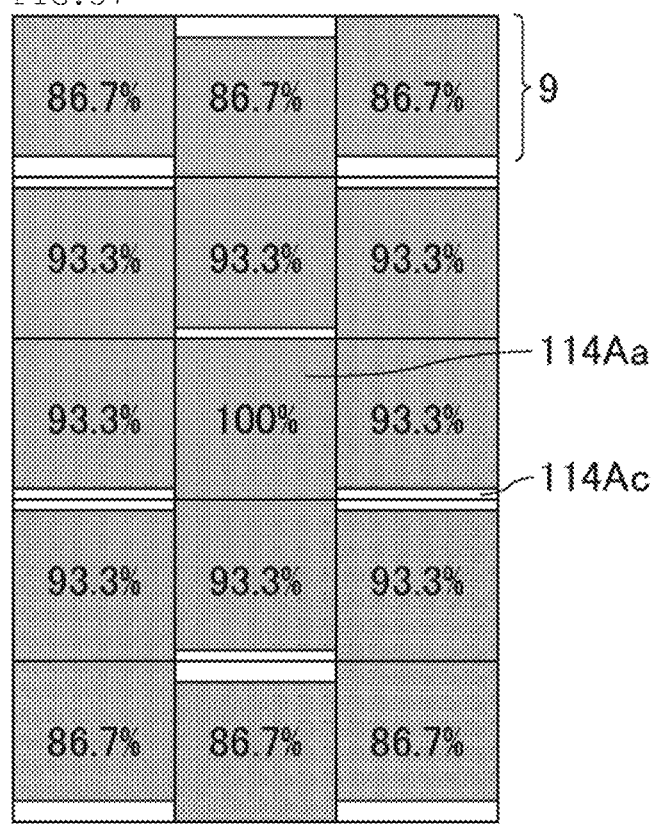
FIG. 37 is a schematic plan view of a preferred arrangement example an overlapping aperture relative to one pixel in the first dimming electrode in FIG. 12.

Hereinafter, with reference to FIG. 36 and FIG. 37, arrangement of the overlapping apertures in a base electrode is described. FIG. 36 is a schematic plan view of an arrangement example of an overlapping aperture relative to one pixel in the first dimming electrode in FIG. 12. FIG. 37 is a schematic plan view of a preferred arrangement example of an overlapping aperture relative to one pixel in the first dimming electrode in FIG. 12. Both FIG. 36 and FIG. 37 are partially enlarged schematic plan views of the base electrode surrounded by the dotted line in FIG. 12. The percentages (%) shown in FIG. 36 and FIG. 37 each indicate the percentage of an electrode area (covering electrode) covering a pixel 9 relative to the area of a single pixel 9 taken as 100%. The percentage of the area of an aperture (overlapping aperture) overlapping a pixel 9 can be appropriately set in view of the width (gap width) between adjacent first dimming electrodes.

Although not shown in FIG. 36 and FIG. 37, the island electrodes 114Bb of the adjacent first dimming electrode 114B may be disposed inside the apertures 114Ac, for example. The apertures 114Ac may include an overlapping aperture overlapping the sub-pixels of all the colors in a single pixel 9. The overlapping aperture is, in a plan view, an aperture portion overlapping a single pixel 9.

In the boundary between the first dimming electrode 114A and the first dimming electrode 114B, a dark line is generated due to the misalignment of the liquid crystal molecules.

Arrangement of the overlapping apertures (apertures 114Ac) in the row direction of the pixels 9 as shown in FIG. 36, a dark line tends to be easily observed in the row direction. In contrast, as shown in FIG. 37, with a single aperture 114Ac for two pixels adjacent in the D3 direction, overlapping apertures can be dispersed without being aligned in a certain direction. This can make the dark lines less likely to be observed. Also, with the apertures 114Ac or the island electrodes 114Bb concentrated as shown in FIG. 37, the number of boundaries between the first dimming electrode 114A and the first dimming electrode 114B is reduced, so that the number of dark line generation portions due to the misalignment of the liquid crystal molecules can be reduced. The overlapping apertures only need to overlap the sub-pixels of all the colors. For example, as shown in FIG. 37, a single aperture may be formed for two or more adjacent pixels, or multiple apertures may be formed for two or more pixels. Also, at least part of a single aperture may overlap the sub-pixels of all the colors.

The overlapping aperture may be formed such that the difference between the maximum aperture area and the minimum aperture area among the aperture areas overlapping the sub-pixels of the multiple colors is 30% or less of the maximum aperture area. This arrangement can reduce or prevent generation of a color shift. The difference between the maximum aperture area and the minimum aperture area among the aperture areas overlapping the sub-pixels of multiple colors is more preferably 10% or less, still more preferably 5% or less, of the maximum aperture area.

With the apertures 114Ac formed such that the aperture area increases toward the outer edge of the first dimming electrode 114A, the aperture width of each of the apertures 114Ac in the second direction is adjusted to increase the aperture area toward the outer edge of the first electrode 114A while controlling the difference between the maximum aperture area and the minimum aperture area overlapping the sub-pixels of the multiple colors to 30% or less of the maximum aperture area.

The backlight 5 is not limited, and may be a conventionally known one in the field of liquid crystal display devices, such as an edge-lit backlight or a direct-lit backlight. A direct-lit backlight is preferred because local dimming driving contributes to a further increase in contrast ratio.

EXAMPLES

The present invention is described based on the following examples with reference to the drawings. The present invention is not limited to these examples.

Example 1

A schematic cross-sectional view of a dimming panel of Example 1 is the same as in FIG. 14. The first electrodes used were first dimming electrodes as shown in FIG. 12. The second electrode used was an electrode including linear electrodes and bridge electrodes as shown in FIG. 10.

As shown in FIG. 10, the second electrode 16 includes the parallel linear electrodes 16a. In Example 1, the extension direction D1 of the linear electrodes 16a was 80° in the counterclockwise direction with the absorption axis of the third polarizing plate 6 or the absorption axis of the second polarizing plate 3 set to 0° in observation from the second substrate 40 side. In other words, the angle θx formed by D1 and one of the absorption axis of the third polarizing plate 6 and the absorption axis of the second polarizing plate 3 was 80°. The second electrode 16 was connected to a common line extending along the outer edge of the dimming panel, and a constant voltage was applied to the second electrode 16.

The regions between the linear electrodes 16a are the slit regions 16b. In each of the slit regions 16b, bridge formation sites 1 to n are set, each of the bridge formation sites having a length obtained by equally dividing a certain length X by n, where n is an integer. Then, the bridge electrodes 16c are formed at respective bridge formation sites selected from the bridge formation sites 1 to n using a random coefficient in Excel®. The first bridge electrode $16c_1$ in the first slit region $16b_1$, the second bridge electrode $16c_2$ in the second slit region $16b_2$, and the third bridge electrode $16c_3$ in the third slit region $16b_3$ were discrete from one another. Since the bridge electrodes 16c were discrete from one another without being periodically arranged Example 1, the portions with the bridge electrodes 16c were less likely to be observed as dark lines.

Comparative Example 1

Figure 38:
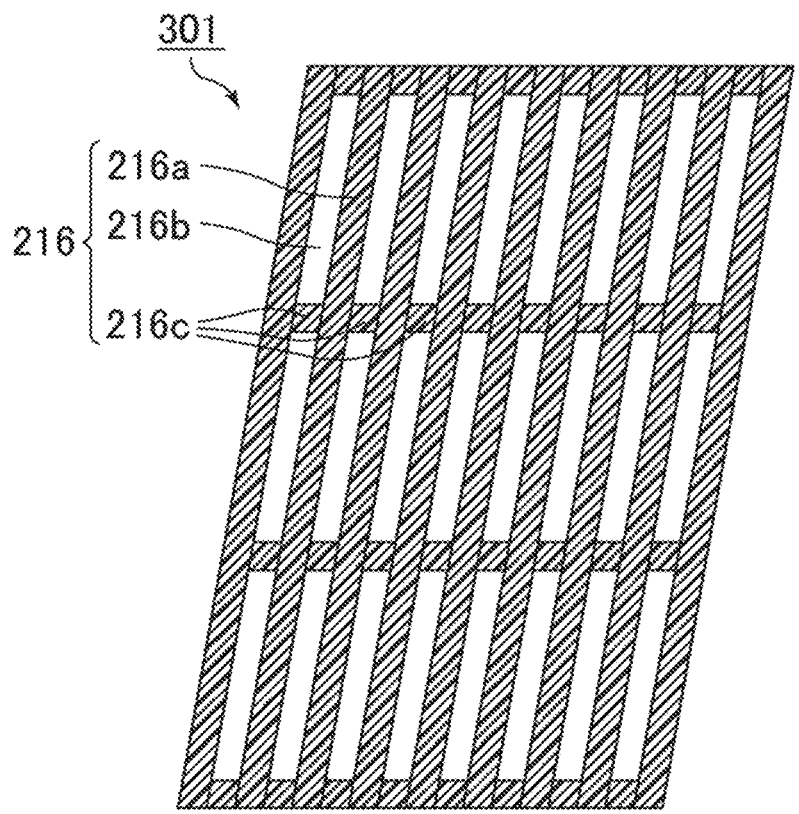
FIG. 38 is a partially enlarged schematic plan view of a second electrode in a dimming panel of Comparative Example 1.
Figure 39:
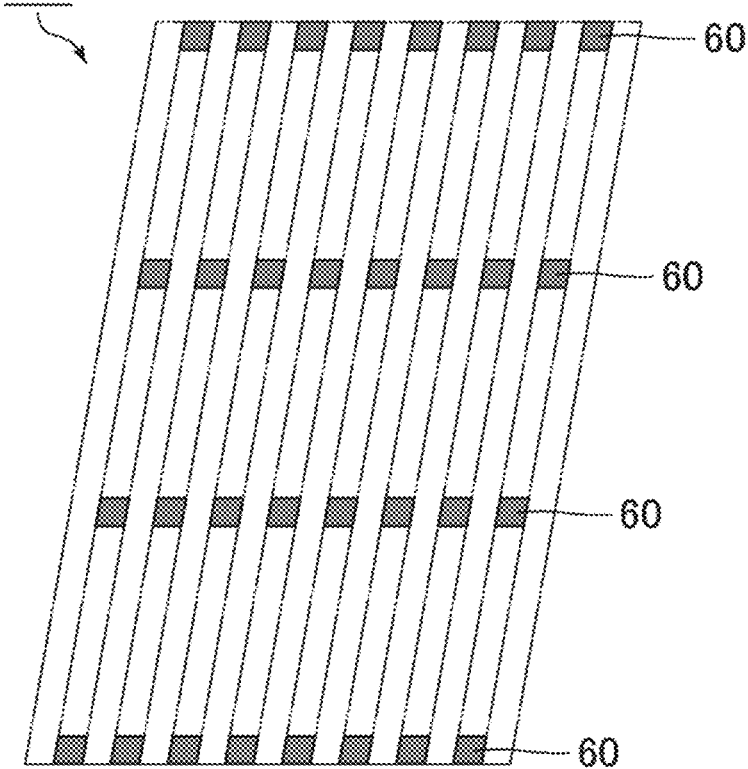
FIG. 39 is a schematic view of misalignment regions in the dimming panel of Comparative Example 1.

A dimming panel 301 of Comparative Example 1 has the same structure as the dimming panel of Example 1, except that the arrangement of the bridge electrodes in the second electrode is different. FIG. 38 is a partially enlarged schematic plan view of a second electrode in a dimming panel of Comparative Example 1. FIG. 39 is a schematic view of misalignment regions in the dimming panel of Comparative Example 1.

As shown in FIG. 38, the second electrode 216 includes parallel linear electrodes 216a. Slit regions 316b are formed between the linear electrodes 216a. Bridge electrodes 216c are arranged in the slit regions 216b and connecting two adjacent linear electrodes 216a. In Comparative Example 1, the bridge electrodes 216c are continuous in a straight line and the sum of the widths of the bridge electrodes 216c is more than five times the width of a single linear electrode 216a. This causes, as shown in FIG. 39, the portions width the bridge electrodes 216c to be observed as a dark line 60. The dark line 60 is observed as a straight line, thus deteriorating the display quality of the dimming panel. Also, when the dimming panel 301 of Comparative Example 1 is overlaid with an image-providing liquid crystal panel, the bridge electrodes 216c arranged continuously in the straight line interfere with the components of the image-providing liquid crystal panel to cause moiré.

What is claimed is:

1. A dimming panel sequentially comprising:
   a first substrate;
   a liquid crystal layer; and
   a second substrate,
   the first substrate sequentially including an insulating substrate, a first electrode, a first insulator layer, and a second electrode,
   the second electrode including, in a plan view, linear electrodes parallel to each other with slit regions in between, and bridge electrodes each of which is disposed in one of the slit regions and is connecting two adjacent linear electrodes,
   the slit regions including a first slit region, a second slit region adjacent to the first slit region, and a third slit region adjacent to the second slit region,
   the bridge electrodes including a first bridge electrode in the first slit region, a second bridge electrode in the second slit region, and a third bridge electrode in the third slit region, the first bridge electrode, the second bridge electrode, and the third bridge electrode being discrete from one another, and the first bridge electrode and the second bridge electrode not being arranged in a straight line.

2. A dimming panel sequentially comprising:

a first substrate;

a liquid crystal layer;

a second substrate;

a drive circuit; and dimming units arranged in an in-plane direction, the first substrate sequentially including an insulating substrate, a first electrode, a first insulator layer, and a second electrode, the first electrode including first dimming electrodes arranged in the respective dimming units, the second electrode including, in a plan view, linear electrodes parallel to each other with slit regions in between, and bridge electrodes each of which is disposed in one of the slit regions and is connecting two adjacent linear electrodes, the slit regions including a first slit region, a second slit region adjacent to the first slit region, and a third slit region adjacent to the second slit region, the bridge electrodes including a first bridge electrode in the first slit region, a second bridge electrode in the second slit region, and a third bridge electrode in the third slit region, the first bridge electrode, the second bridge electrode, and the third bridge electrode being discrete from one another, and the drive circuit being configured to control voltages to be applied to the respective first dimming electrodes and applying a constant voltage to the second electrode.

3. The dimming panel according to claim 2, wherein the first substrate further includes, between the insulating substrate and the first electrode, sequentially from the insulating substrate, a lower-layer electrode and a second insulator layer, each of the first dimming electrodes includes island electrodes spaced from one another in the plan view and electrically connected to one another, and at least one of the island electrodes is electrically connected to the lower-layer electrode through a contact hole.

4. The dimming panel according to claim 3, wherein at least one of the island electrodes of a selected electrode among the first dimming electrodes is between the island electrodes of an adjacent electrode among the first dimming electrodes, and at least one of the island electrodes of the adjacent electrode is between the island electrodes of the selected electrode.

5. The dimming panel according to claim 3, wherein each of the first dimming electrodes further includes a base electrode provided with apertures, the island electrodes surround the base electrode in the plan view, the base electrode is electrically connected to the lower-layer electrode through another contact hole, and at least one of the island electrodes of a selected electrode among the first dimming electrodes is inside at least one of the apertures of an adjacent electrode among the first dimming electrodes, and at least one of the island electrodes of the adjacent electrode is inside at least one of the apertures of the selected electrode.

6. A liquid crystal display device sequentially comprising:

an image-providing liquid crystal panel;

the dimming panel according to claim 2; and a backlight.

7. A dimming panel sequentially comprising:

a first substrate;

a liquid crystal layer;

a second substrate;

a drive circuit; and dimming units arranged in an in-plane direction, the first substrate sequentially including an insulating substrate, a first electrode, a first insulator layer, and a second electrode, the second electrode including second dimming electrodes arranged in the respective dimming units, the second dimming electrodes including, in a plan view, linear electrodes parallel to each other with slit regions in between, and bridge electrodes each of which is disposed in one of the slit regions and is connecting two adjacent linear electrodes, the slit regions including a first slit region, a second slit region adjacent to the first slit region, and a third slit region adjacent to the second slit region, the bridge electrodes including a first bridge electrode in the first slit region, a second bridge electrode in the second slit region, and a third bridge electrode in the third slit region, the first bridge electrode, the second bridge electrode, and the third bridge electrode being discrete from one another, and the drive circuit being configured to apply a constant voltage to the first electrode and controlling voltages to be applied to the respective second dimming electrodes.

8. A liquid crystal display device sequentially comprising:

an image-providing liquid crystal panel;

the dimming panel according to claim 7; and a backlight.

* * * * *